United States Patent [19]
Goldberg

[11] Patent Number: 6,098,463
[45] Date of Patent: *Aug. 8, 2000

[54] METHOD AND APPARATUS FOR MEASUREMENT OF WIDE DYNAMIC RANGE SIGNALS

[75] Inventor: Jack Goldberg, San Diego, Calif.

[73] Assignee: Etymotic Research, Inc.

[ * ] Notice: This patent issued on a continued prosecution application filed under 37 CFR 1.53(d), and is subject to the twenty year patent term provisions of 35 U.S.C. 154(a)(2).

[21] Appl. No.: 08/801,999

[22] Filed: Feb. 18, 1997

[51] Int. Cl.$^7$ ............................. G01H 1/00; G01H 3/14
[52] U.S. Cl. ............................. 73/646; 73/645; 73/570; 324/438; 356/213
[58] Field of Search ...................... 73/40.5 A, 592, 73/602, 649, 646, 570, 587, 645, 647, 648; 324/438; 356/213

[56] References Cited

U.S. PATENT DOCUMENTS

| | | | |
|---|---|---|---|
| 4,518,917 | 5/1985 | Oates et al. | 73/661 |
| 4,829,824 | 5/1989 | Hillger et al. | 73/614 |
| 4,977,880 | 12/1990 | Bonfiglioli et al. | 73/118.1 |
| 5,137,026 | 8/1992 | Waterson et al. | 73/861.52 |
| 5,293,555 | 3/1994 | Anthony | 73/577 |
| 5,333,501 | 8/1994 | Okada et al. | 73/592 |
| 5,347,843 | 9/1994 | Orr et al. | 73/1.34 |
| 5,557,969 | 9/1996 | Jordan | 73/592 |

FOREIGN PATENT DOCUMENTS

| | | | |
|---|---|---|---|
| 179 231 | 8/1991 | Japan | 73/592 |
| 1601 535 | 10/1990 | Russian Federation | 73/592 |

*Primary Examiner*—Hezron Williams
*Assistant Examiner*—Nashmiya Fayyaz
*Attorney, Agent, or Firm*—McAndrews, Held & Malloy, Ltd.

[57] ABSTRACT

A method and apparatus for measurement of wide dynamic range signals is provided. The method and apparatus is particularly suited to measurement of physical parameters over a wide dynamic range and utilizes a plurality of concurrently operating channels of moderate dynamic range, each of which incorporates a detector. The method has the steps of transducing the physical signal into an electrical signal; amplifying and filtering the electrical signal through a plurality of channels, each of which operating within a preselected range of levels; applying the filtered and amplified electrical signals to a plurality of detectors, one for each channel; averaging, using a first time constant, the electrical signals to create a plurality of outputs; sampling the outputs; determining which channel of the plurality of channels has a valid output; averaging, using a second time constant greater than the first time constant, the resultant series of valid output samples (i.e., averaging the resultant magnitude signal) to provide a time-weighted decibel value, a series of which over time representing a varying average magnitude output signal; and periodically displaying the decibel value to the user of the apparatus.

26 Claims, 13 Drawing Sheets

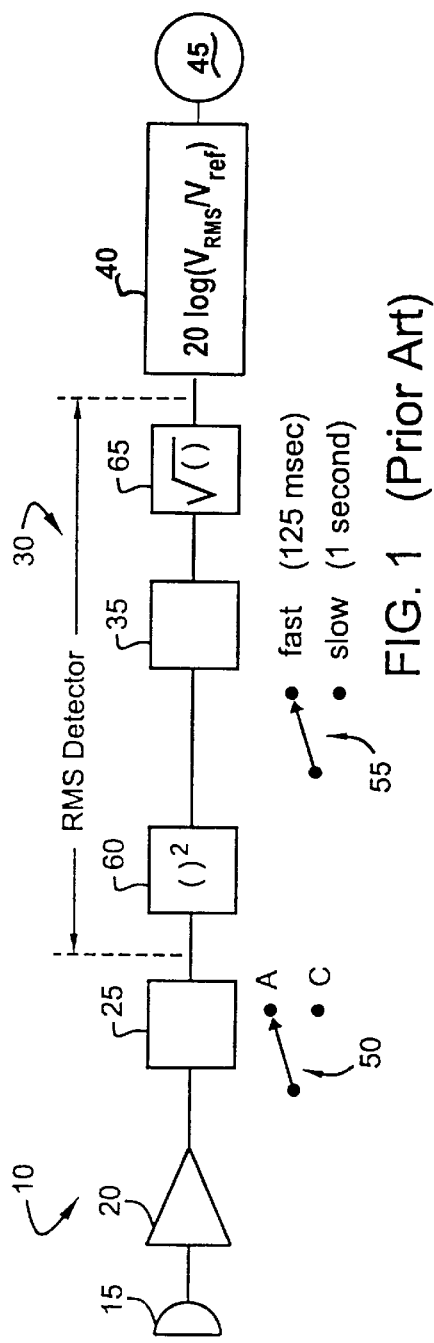
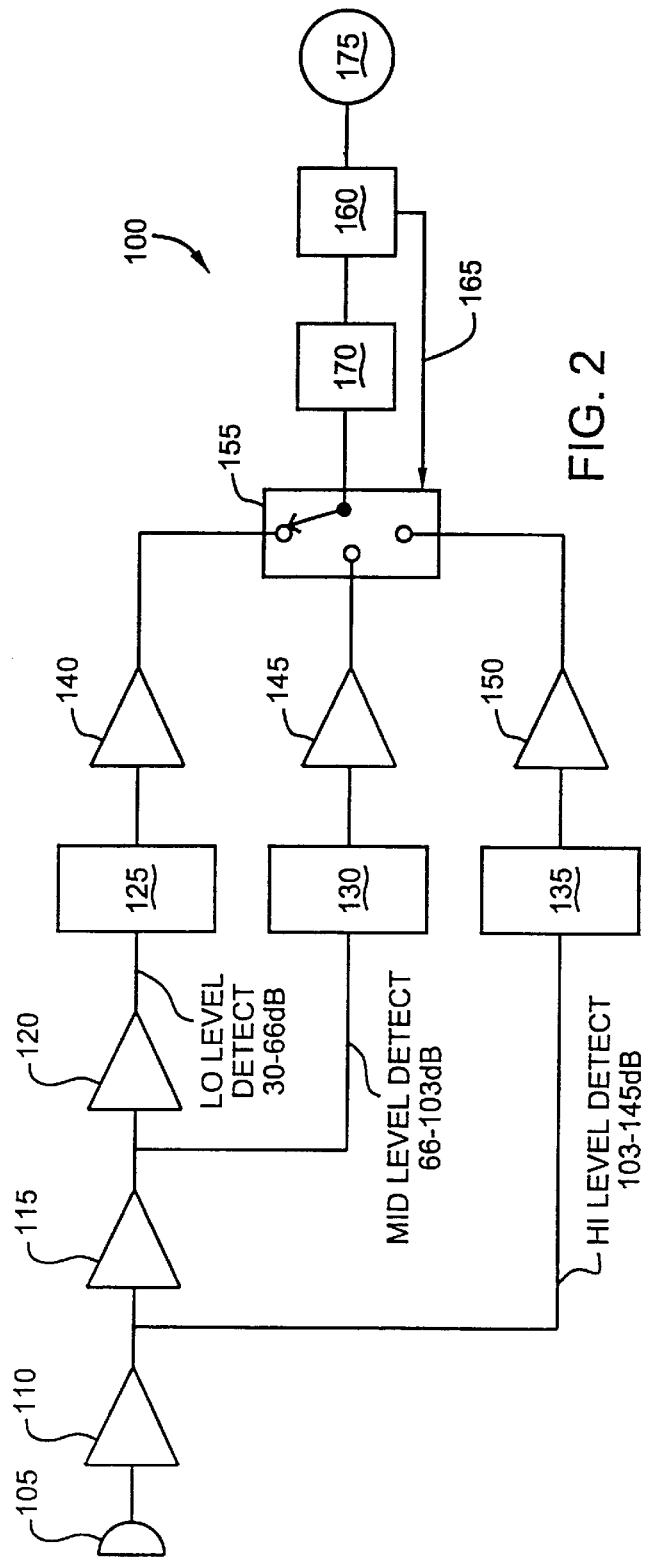

| FIG. 4C | FIG. 4F |
|---|---|
| FIG. 4B | FIG. 4E |
| FIG. 4A | FIG. 4D |

METHOD AND APPARATUS FOR MEASUREMENT OF WIDE DYNAMIC RANGE SIGNALS

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

This invention relates to instrumentation for measurement of physical signals. More particularly the invention can be utilized in a system for the measurement of the amplitude of a physical signal, such as light, sound, vibration or pH (acidity). However, in the broad sense, this invention has application to the measurement of any wide dynamic range signal.

In the measurement of physical signals, such as sound, there must always be a transducer, for example, in the case of sound, a microphone, which converts the physical signal into an electrical signal. The transducer's electrical signal must have a dynamic range as wide or wider than the dynamic range over which the measurement system is intended to accurately function, and, in general, the electrical signal must be processed in some manner in order to extract or compute the particular parameter of interest, for example, the level of sound.

The specifications of modern measurement systems are complex. An example is the International Electrotechnical Commission (IEC) specification for sound level meters. As of this writing, the IEC is preparing a new standard for sound level meters called IEC 1672. The October 1996 draft, entitled *Second Committee Draft 1672: Electroacoustics—Sound level meters,* is the proposed revision of the long-standing IEC 651, first issued in 1979. This document thoroughly defines the required functionality of sound level meters of various types. Sound pressure is the root-mean-square of the instantaneous sound pressure over a time interval and sound level is the relative frequency-weighted and time-weighted sound pressure, expressed in decibels. The reference sound pressure (0 dB SPL) is 20 microPascals or 0.0002 dynes/cm$^2$ and both frequency and time weighting are specified in the IEC standard. The sound pressure of an isolated acoustic event of duration T can therefore be evaluated by integrating the square of the instantaneous pressure over the interval F and then computing the square root, provided that T is short compared to the time constant employed for exponential time-weighting.

In this and earlier sound level meter (SLM) standards, various levels of performance are defined and specified. Type 1 meters require extremely stable and accurate microphones and very tight circuit tolerances and are, therefore, expensive. Type 2 meters need not exhibit as high a level of performance. The basic accuracy of a Type 2 meter is ±1 dB over a temperature range from −10° C. to +50° C. linearity over the entire range must be ±1 dB, with greater linearity (±0.5 dB) for small changes in level. A Type 2 SLM must have a minimum dynamic range of 60 dB, however, users expect it to be wider. In order to measure sound level as defined above, a sound level meter must include certain components and have certain capabilities. FIG. 1 illustrates a basic sound level meter system indicated generally at 10.

A transducer, for example, a microphone 15 is connected to an amplifier 20. Audio amplification is necessary to increase the level of the signal from the microphone 15 for the processing of weak sounds, and audio filtering circuitry 25 is necessary to achieve the frequency-weighting requirement. The key element which extracts the sound level from the filtered and amplified microphone signal must be a detector with specific characteristics, either a root-mean-square (RMS) type or a mean-square type. In this case, an RMS type detector 30 is shown. Exponential time-weighting is incorporated using a filter 35 within the RMS detector circuitry. Finally, the exponentially time-weighted RMS level is converted to decibels at block 40 and displayed at a display 45. The output of the RMS detector 30, $V_{RMS}$ is converted in block 40 to decibels by the relationship dB=20 log($V_{RMS}/V_{ref}$), where $V_{ref}$ is the RMS detector's theoretical output at the reference sound pressure level, 0 dB SPL.

As shown in FIG. 1, frequency-weighting takes place prior to detection of the signal. Two types of frequency-weighting are specified for SLMs, "A" and "C", selected by switch 50. A-weighting is generally used for the measurement of low level sounds, because it roughly represents hearing sensitivity at low intensities, and C-weighting is generally used for the measurement of high level sounds.

Time-weighting takes place during and/or after detection of the audio signal. Time-weighting is necessary because observers of physical phenomenon are not generally concerned with activity which takes place over very short durations the duration being dependent upon the nature and purpose of the measurement. For example, transient acoustic events which are so short as to be inaudible or too short to cause any hearing damage will be of no concern to the general user of a sound level meter. Thus, there is always some time-related specification involved in the measurement of physical phenomena. Most acoustic events present a continuously varying level of sound. Sometimes, high intensity transients are present along with a steady background level. A system which continuously measures a physical parameter, such as sound, must, therefore, present some sort of "running average." The standardized method of calculating a running average sound pressure is to utilize exponential time-weighting. In the measurement of sound, two common exponential time-weighting options are generally employed, referred to as "FAST" and "SLOW", selected in FIG. 1 by using switch 55. FAST time-weighting involves a 125 millisecond time constant at filter 35 and SLOW time-weighting involves a 1 second time constant at filter 35.

RMS detection is at the heart of most sound level measurements. Various hardware methods are used to compute RMS, including thermal conversion which has been utilized in what are known as true RMS-reading AC voltmeters. In a thermal conversion type meter, the incoming signal is amplified and actually heats up a resistive element. The temperature rise of that element is measured and indicates the average power or mean square value of the signal. Time-weighting takes place because of the finite thermal mass of the element and also due to the conduction of heat out to the environment. Although simple in concept, thermal conversion is difficult to implement. However, it remains one of the best and most popular methods of RMS detection.

Alternatively, circuitry as shown in FIG. 1 has been constructed to explicitly perform the RMS calculation by first squaring the input signal at a squarer 60, then averaging it at the filter 35, and finally computing the square root at block 65. The design of accurate wide dynamic range explicit analog computational circuits, such as one which derives the square root, are challenging, and, therefore, other methods have been developed. RMS detectors are available which incorporate indirect or implicit computation of the square root, accomplished, for example, by means of feedback and analog division. Implicit detection generally provides wider dynamic range at lower cost when compared to explicit means. The averaging components of both explicit and implicit RMS detectors generally provide exponential time-weighting.

The final step in deriving the sound level is to convert the frequency and time-weighted sound pressure to decibels. This involves the computation of the logarithm, generally accomplished with circuitry that relies on the logarithmic relationship between the collector current in a transistor and its base-emitter voltage. This relationship is well-known to those familiar with semiconductor physics and involves a strong dependency on temperature. It is important, therefore, to provide temperature compensation whenever this analog type of logarithm computation is employed.

A problem encountered in the design of wide dynamic range measurement systems such as sound level meters is that the dynamic range of the detector and/or the circuit which converts to decibels is often smaller than desired, thus limiting the performance of the system. An alternative is to utilize more sophisticated circuitry with wider range, however, doing so increases the system cost. It must be understood than an ideal measurement system would cover its entire dynamic range without any operator intervention. In such a system, when measurements are taking place, the instrument would acquire valid readings over its entire dynamic range even while unattended. When the usable dynamic range of a detector in a measurement system is limited, i.e., smaller than the dynamic range of the instrument itself, it becomes necessary to provide the user with a switch to manually set the range of the instrument. This switch would generally either control the amount of gain or attenuation which precedes the detector such that signals to be measured always fall within the range of the detector. Manually operated range switching is generally undesirable because it implies the need for an extra step on the part of the user to ensure that the instrument is in a range appropriate to the incoming signal.

In some measurement systems, range switching is performed automatically by the instrument itself. In these automatic ranging systems, there is generally a transient in the measurement data which occurs around the time of the range switching. The resulting gap of valid data is sometimes unimportant, as in the case of an autoranging laboratory voltmeter. However, in the measurement of many physical phenomena, gaps or invalid data is undesirable.

As pointed out above, time-weighting is an important aspect of measurement systems. To implement a system with both FAST and SLOW modes, common designs of sound level meters, for example, incorporate the switch 55 as shown in FIG. 1 which modifies the RMS detector's time constant. It is often desirable to be able to control the exponential time-weighting remotely, e.g. by means of a personal computer attached to the instrument through a serial port. It is also desirable to be able to set the time-weighting to any of a variety of values under computer control.

In addition, providing useful measurement data at very low input signal levels is a common problem with known measurement systems. At low levels, microphone (transducer) and amplifier noise in the measurement system interfere with accuracy. A solution to this problem is to use less noisy and more expensive components. However, it is desirable to improve the low-level capability of measurement systems without significantly increasing cost.

Another problem with some wide dynamic range measurement systems is related to operation over temperature variations. Sound level meters, for example, are expected to be accurate at temperatures ranging from −10° C. to +50° C. This is especially challenging for analog computation circuitry. It is desirable for measurement systems such as sound level meters to be accurate over a wide range of temperatures.

An example of high-quality Type 2 sound level meter is the Quest Technologies Model 2400. In this meter, the RMS detector and circuitry for converting to decibels have a dynamic range of 70 dB. The device has two different switch-selectable overlapping ranges: 30 dB to 100 dB and 70 dB to 140 dB. In order to enable the instrument to measure over its entire 110 dB dynamic range, the user must intervene to switch amplitude ranges and ensure that the set amplitude range encompasses the levels being presented to the instrument for measurement. The techniques used in the design of this instrument to provide its 110 dB dynamic range include the use of a high-quality RMS detector, the use of a wide range circuit for computing the logarithm, and the necessary user-operated range switch to select one of two overlapping amplitude ranges.

The Larson-Davis Model 700, on the other hand, has a detector and decibel computation circuit which is accurate over a full 100 dB of dynamic range and is also a Type 2 instrument. This device has no range switch and is a more expensive and sophisticated device because, as the dynamic range is increased, accuracy, linearity, and temperature compensation are all more difficult to attain.

BRIEF SUMMARY OF THE INVENTION

The present invention provides a method and apparatus for measuring wide dynamic range signals and utilizes a plurality of concurrently operating channels of moderate dynamic range, each of which incorporates a means of level detection. The outputs of the plurality of level detectors are sampled by an analog-to-digital converter and a determination of which channel contains valid data for further processing is performed in real time by a processor. The processor computes a series of time-weighted decibel values which are displayed to the user. As a result, the present invention provides a method and apparatus having a very wide dynamic range utilizing moderate dynamic range detectors.

The present invention also provides a method and apparatus for measurement of wide dynamic range signals which has full remote control and data logging capability and is capable of measurement throughout its entire dynamic range without the need for manual ranging or other operator intervention. The method and apparatus provide measurement data over its entire dynamic range without any transient gaps or errors caused by automatic ranging. In addition, the method and apparatus are low cost and simple to operate.

The method and apparatus improve on the detector and subsequent signal processing present in wide dynamic range measurement instruments. Practical low-cost detectors with moderate dynamic range, for example, 40 dB, can be used in the present system to realize a wide dynamic range, 80 dB or greater, depending on the number of analog processing channels. Microcontroller-based signal processing in the present invention can dynamically and accurately compensate for temperature dependencies exhibited by analog components and can provide exponential time-weighting with great precision and with a wide range of user-selectable time constants.

The new and improved wide dynamic range measurement system of the present invention is accurate and cost effective, providing enhanced measurement capabilities and ease of use.

BRIEF DESCRIPTION OF THE SEVERAL VIEWS OF THE DRAWING

FIG. 1 is a prior art block diagram of a sound level meter system.

FIG. 2 is a schematic block diagram of an embodiment of the present invention.

FIG. 3 is a schematic block diagram of another embodiment of the present invention illustrating the layout of FIGS. 4A–4F.

Figure 4B:
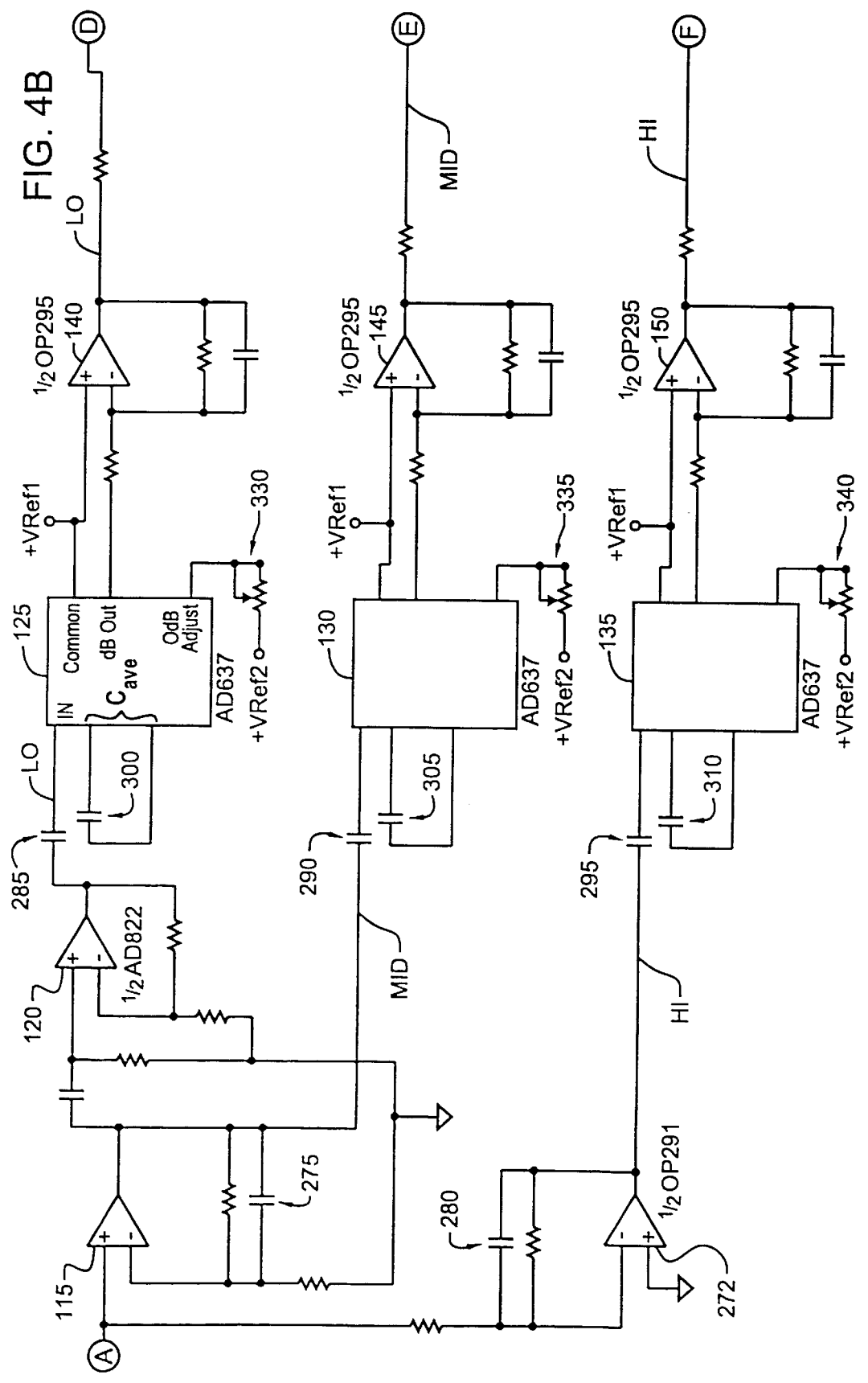

FIGS. 4A–4F are circuit diagrams of an embodiment of the apparatus of the invention.

DETAILED DESCRIPTION OF THE INVENTION

Figure 4A:
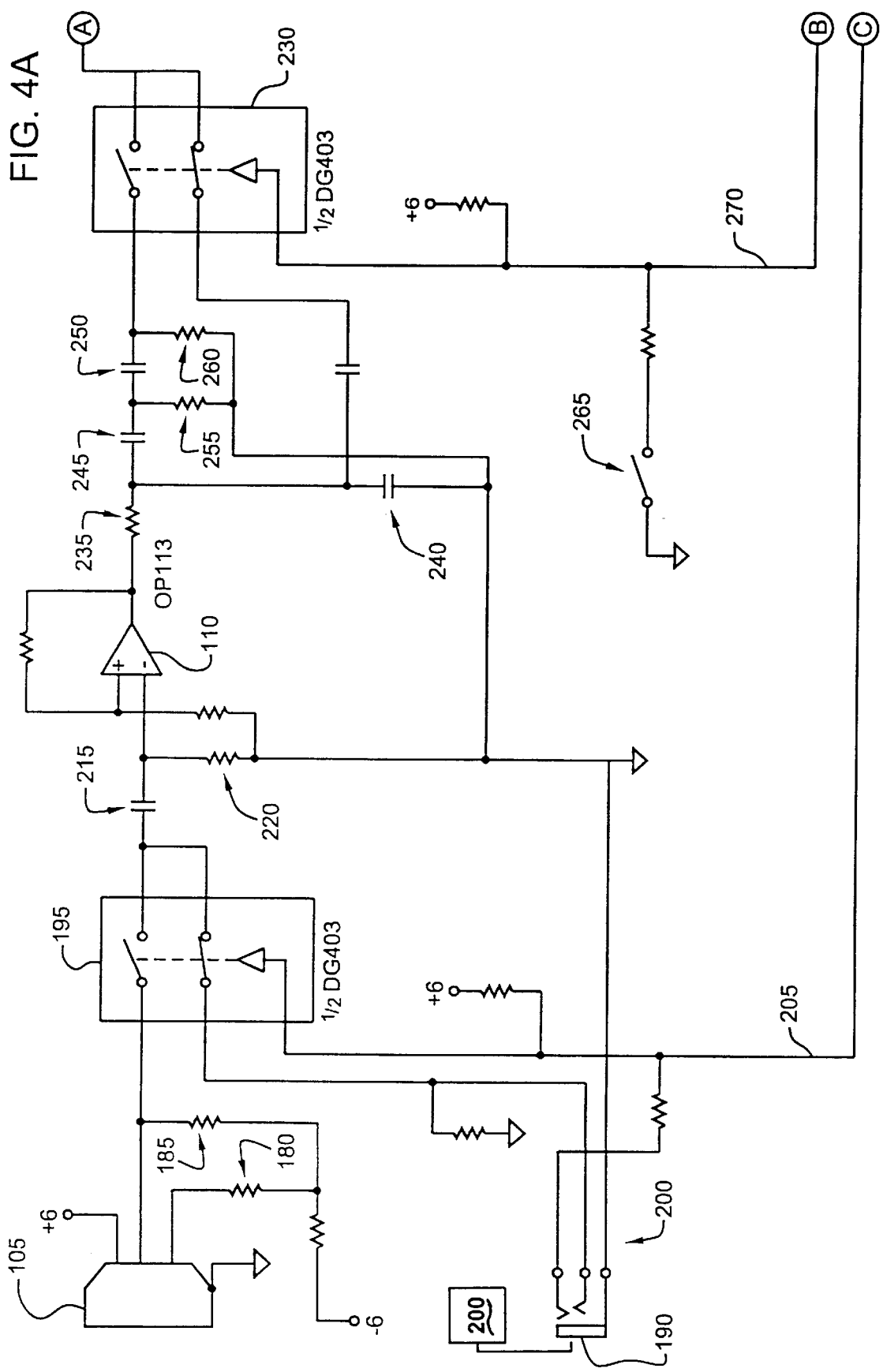

The method and apparatus of the present invention improve on the signal processing present in wide-dynamic range measurement instruments by utilizing plurality of concurrently operating channels of moderate dynamic range. The method and apparatus utilize practical low-cost detectors with moderate dynamic range, for example, less than 50 dB, in a system with very wide dynamic range, for example, greater than 110 dB. An embodiment of a sound level meter which operates in accordance with the principles of the present invention is described below. The measurement of sound level illustrates one application of the utility of the invention, however the method and apparatus disclosed herein could be applied to a variety of other wide dynamic range measurement problems.

Root-mean-square detectors having greater than 40 dB of dynamic range are available in integrated circuit form, such as Analog Devices' AD637. A version of this particular integrated circuit is available which, if properly utilized, can detect with an accuracy of better than ±0.5 dB over a 50 dB range and over the full temperature range required for sound level meters.

An embodiment of the invention provides a sound level meter which utilizes inexpensive and easy-to-use components like the AD637, yet provides an instrument with approximately 110 dB of measurement capability. The apparatus of the present invention provides such a capability, and the method of the invention can also be applied to the use of other types of detectors in systems with other wide dynamic range signal measurement requirements.

FIG. 2 illustrates a simplified schematic block diagram of an embodiment of a system of the present invention illustrated generally at 100. An input signal is applied to three different analog signal processing paths. Each of the three paths handles a different range of input signal amplitudes. A processor facilitates the selection of the proper in-range channel for further digital signal processing and display.

Referring now specifically to FIG. 2, a microphone 105, is provided to transduce sound and provide an electrical output signal indicative of the instantaneous sound pressure. The microphone output signal is passed through a first input amplifier 110 and also through a second amplifier 115 and a third amplifier 120. A low level detect channel, LO, includes amplifiers 110, 115 and 120 and has sufficient gain for the processing of low level signals. Simultaneously, the microphone output signal passes through only the first input amplifier 110 and the second amplifier 115 in a mid level detect channel, MID, which has less gain than the LO channel. The highest level signals are processed by the high level detect channel, HI, which has the least gain of the three channels, and includes only the first input amplifier 110.

Assuming that the microphone 105 and amplifiers 110, 115, 120 are sufficiently quiet (can handle signals near the bottom of the dynamic range without introducing any significant error due to noise) and that the microphone 105 and the first amplifier 110 both have sufficiently high saturation levels (can handle large signals near the top of the dynamic range without distortion), the three different channels, LO, MID and HI, which have three different gains governed by the particular amplifiers present in the channel paths, can accurately and simultaneously process signals over a very wide dynamic range.

For example, relatively low level signals, from 30 dB to 66 dB, are handled by the channel with the highest gain, the LO channel, which includes all three amplifiers 110, 115 and 120 in its path. Mid-level signals, for example, from 66 dB to 103 dB are handled by the channel with moderate gain, the MID channel, and high level signals, for example, greater than 103 dB, are handled by the channel with the least gain, the 111 channel.

The amplified signals on the various channels, LO, MID and HI, feed into respective detectors 125, 130 and 135. The LO channel feeds into detector 125;

similarly, the MID channel feeds detector 130, and the HI channel feeds detector 135. Each detector output subsequently passes through an additional respective amplifier 140, 145 or 150 before coming together at a multiplexer (MUX) 155. The MUX 155 is controlled by a processor 160 via control lines 165 and selects one of the three channel signals for connection to an analog-to-digital converter subsystem 170.

The outputs of these three detectors 125, 130 and 135 can be sampled by the analog-to-digital converter subsystem or ADC, 170, and the resulting stream of numbers (three digital signals) can be processed by the processor 160. The processor 160 can then dynamically select the channel LO, MID or HI which is in-range and perform the necessary computations for exponential time-weighting and conversion to decibels as well as the display interface functions. In an embodiment, the processor 160, ADC 170, MUX 155 and control lines 165 are incorporated in a microcontroller.

The system 100 can be described as performing automatic ranging on a sample-by-sample basis; therefore, no gaps or errors in the measurement results occur as the input varies throughout the dynamic range of the instrument. Data from all of the channels is processed by the processor 160 and a visual indication of the measured sound level in decibels is provided by a display 175. In conjunction with the multiple-channel implementation of the invention and software which determines rapidly in real-time which channel to process, the measurement system of the invention provides a "virtual dynamic range" which greatly exceeds that of any individual channel or any RMS detector utilized. In prototypes constructed, three channels of about 40 dB dynamic range each were used, resulting in a virtual dynamic range of over 110 dB.

The magnitude of the output signals supplied by the detectors 125, 130 and 135 when they are receiving signals within their respective ranges is an important consideration in the present invention. As set forth above, sound level meter accuracy is specified in decibels. A Type 2 meter (as described in the IEC specification mentioned above) must measure to better than ±1 dB of accuracy under reference conditions. Linearity for a Type 2 sound level meter must be better than ±1 dB for changes 10 dB or greater and better than ±0.5 dB for changes from 1 dB to 10 dB. The measurement precision must therefore exceed 0.5 dB. If, for example, the goal is to design a measurement system according to the present invention with 0.25 dB of resolution, the ADC 170 would need to be able to "see" a difference of less than 0.25 dB.

One embodiment of the invention consistent with the block diagram of FIG. 2 utilizes a plurality of mean-square detectors, rather than RMS detectors as in FIG. 1. A 10 dB change in the input signal level of such a detector produces a 10 times change in the magnitude of its output signal. In the case of a MID channel covering 37 dB, for example, the associated mean-square detector output magnitude would vary over a range of about 5000 to 1 ($10^{37/10} \approx 5011.9$). The lowest levels of any given channel range are the most challenging in terms of meeting the above-mentioned 0.25 dB resolution. A 16-bit ADC, for example, allows the recognition of a change of one part in $2^{16}$ or 1/65536. At the bottom of a 37 dB wide span with a mean-square detector, a 16-bit ADC provides a minimum resolution of $10\log(1+10^{37}/65536)$ or about 0.32 dB; and a 17-bit ADC provides a resolution of about 0.16 dB.

Because 16-bit ADCs are expensive, it is preferable to process the signal prior to analog-to-digital conversion in a manner which allows the use of a lower resolution ADC. The use of a plurality of root-mean-square detectors rather than mean square detectors reduces the precision required of the analog-to-digital converter to about 11 bits: $20\log(1+10^{37/20}/2^{11})=0.30$ dB.

There are many varieties of microcontrollers which incorporate I/O lines, serial communication, timers, analog-to-digital conversion and/or other peripheral capabilities along with a processor all in a single integrated circuit package. A typical microcontroller incorporates an 8-bit ADC. Some more expensive parts include 10 bit converters. The inventor knows of no microcontroller which has an integral 11 or 12 bit converter. If an 11-bit converter were required, it would need to be incorporated into the measurement system 100, therefore, as a separate integrated circuit.

A preferred embodiment, which significantly alleviates the precision requirement of the ADC in the present wide dynamic range measurement system, utilizes a plurality of detectors, each of which provides an output signal representative of the logarithm of the root-mean-square value (log-RMS) of the detector input signal. Thus the detectors 125, 130, 135 may preferably be AD637 devices which are RMS detectors providing a log-RMS output. The magnitude of the log-RMS output of a detector such as the AD637 spans a range proportional to the range of the detector input signal in decibels. An 8-bit AI)C driven by the log-RMS output of a detector such as the AD637 with a 40 dB input signal range could theoretically "see" a change of $37/2^8$ or about 0.14 dB, precise enough for a measurement system with a resolution of 0.25 dB.

The present invention uses a log-RMS detector before the ADC in a multi-channel measurement system. This not only lessens the requirement for ADC precision but also ensures that measurement resolution is the same throughout the dynamic range of the system, expressed in decibels. Many physical phenomena are measured on a logarithmic scale: sound and vibration are measured in decibels and acidity is measured in pH, also a logarithmic scale. The Richter scale is yet another example of a logarithmic scale.

Additionally, the sampling rate for data acquisition in the present invention must be chosen appropriately to provide data which can be processed to meet the exponential time-weighting specification. Consider the sampling rate requirements of a system as in FIG. 2 with three channels and exponential time-weighting requirements as specified by the IEC for sound level meters. As mentioned above, both FAST (125 millisecond) and SLOW (1 second) exponential time* weighting are generally provided. The IEC specification precisely defines the requirement and the testing necessary to ensure conformance. The latest draft standard calls for testing where a single isolated tone burst is presented to the instrument and the maximum reading in response to that stimulus is required to be within a specified range. Responses to tone bursts as short as one cycle at 4 kHz (250 microseconds) are specified by the IEC standard. It can be shown that, when an RMS detector with a time constant significantly faster than 125 milliseconds (for example 12.5 milliseconds) is utilized in a sampled data system, such as that of the present invention, with a sufficiently high sampling rate (for example, 1024 samples per second) and with properly designed digital processing and filtering, the resultant measurement can completely conform to the IEC-specified exponential time-weighting requirements.

In a preferred embodiment of the invention, the time-weighting takes place primarily in software, rather than entirely at the detectors. Thus, the time constant used is controlled by software and the FAST/SLOW switch is used to provide an input to the microcontroller rather than select components within the analog circuitry of a plurality of channels. Software controlled time-weighting is more accurate, more flexible, and less expensive that selecting components within the circuitry of the detectors.

Analysis of the signal which results at the output of the detectors will yield sampling rate requirements, which depend on details of the implementation and design goals of the measurement system. For example, in the case of sound level meters, with FAST time-weighting, the response to a 100 millisecond 4 kHz toneburst must be within ±1 dB of nominal and the response to a 250 microsecond 4 kHz toneburst must be from +1.5 dB to −5 dB with respect to nominal. Thus, errors due to sample timing and the software algorithm for time-weighting must be minimal. If sample timing is too slow, the response to the toneburst will be inaccurate and erratic because the data stream representing the waveform at the output of the detector will not contain sufficient information; the result will be toneburst response that is generally low because the peak of the detector's response may be missed by the ADC. Sample timing which is too fast, on the other hand, results in unnecessary computational complexity and may require a faster or more powerful microcontroller.

Sampling rate requirements increase when the averaging components of the detectors utilized in the invention are such that a short time-constant results. This is because a short time constant at the detector results in a faster response to a toneburst stimulus, and thus the data acquisition must be more rapid in order to accurately process that response. In an embodiment of the invention, the time constant at the detectors is about 12.5 milliseconds and the sampling rate utilized is about 1 millisecond. For an RMS detector that provides exponential time weighting with a time constant of 12.5 milliseconds, when a steady input signal is applied and then suddenly removed, the output signal level decreases at a rate of about 350 dB per second: $10\log(e^{-1/0.0125}) \approx 350$. The signal level at the detector output therefore drops about ⅓ dB per millisecond and thus in order to ensure accurate toneburst response, a sampling period of about 1 millisecond or less is required. For a 1 millisecond sampling period, each of the three channels is sampled once per millisecond, thus resulting in 3000 samples per second. The software must determine which of the three channels has the valid signal for that particular sampling period and it must process that signal appropriately. Each channel has its own GAIN and OFFSET and the RMS detectors also exhibit temperature dependency. These factors must all be considered as the stream of sampled data is processed. Although each channel may be sampled once per millisecond, the sampling period of the digital filter which provides exponential time-weighting need not be as short. Slowing the digital processing which provides time-weighting reduces the computational load on the microprocessor and in an embodiment of the invention, the sample period for the digital filter may be 4 times that of the ADC, or about 4 milliseconds.

In an embodiment of the invention described below with reference to FIGS. 6A–6D, the microprocessor utilizes software to perform the following tasks in processing the output signals of the three detectors 125, 130 and 135:

1. Sampling each channel once per millisecond, thus acquiring 3000 samples per second,
2. Once per millisecond, determining which channel has a valid sample and storing that sample;
3. Repeating steps 1 and 2 four times and selecting the sample representing the largest dB value and storing that sample (MAXRAW), thus updating MAXRAW once every 4 milliseconds,
4. Applying the channel GAIN and OFFSET along with temperature compensation to the stream of MAXRAW samples, resulting in a digital signal representative of decibels;
5. Converting that decibel representation to a value representative of the power of the signal (power is proportional to the antilog of decibels divided by 10);
6. Inputting that "power-domain" value to a simple one-pole infinite impulse response (IIR) digital filter which has a time constant consistent with either the FAST or SLOW mode, resulting in a time-weighted mean-square sample once every 4 milliseconds: and
7. Periodically converting the filter output to a value representative of decibels for display to the user (dB= constant+10log(power)), updating the displayed measurement result once every 32 milliseconds.

The dynamic selection of the channel in real-time is thereby performed in the invention. It need not be apparent to the user of the system which channel is actually active during any given sampling period. In an embodiment of this invention, the instrument appears to have a full 110 dB of dynamic range, despite the fact that during any one sampling interval the instrument is using a channel with only about 40 dB of dynamic range. Samples from all three channels LO, MID and HI flow through the digital signal processing algorithm which computes the exponential time-weighting function, but only one channel of the three is used during any sampling period. The data from the other two channels is discarded.

As an example, consider a signal which is steady at 80 dB. In an embodiment of the invention, 80 dB is greater than the highest level which can be processed by the low-level (high gain) channel; the LO channel is saturated, and its data is invalid. In contrast, an 80 dB signal is below the range of the high level (low gain) channel; the HI channel is also invalid. The middle channel data is therefore utilized during any sampling interval when the input signal is 80 dB because only the MID channel is in range.

The above explanation is somewhat simplified for several reasons. First, the sampling of the three channels does not occur precisely at the same time and the input signal is generally constantly varying. Also, the characteristics of the amplifiers and filters which precede the three detectors are not precisely matched so that the detectors do not see three exactly scaled versions of the same signal. Further, the detectors themselves behave somewhat non-linearly, especially for signals with large amplitude transients.

Another aspect of the invention is software correction for low signal levels in order to extend dynamic range. At low levels, the noise of the microphone 105 and first amplifier 110 can affect the measurement accuracy. This problem can be significantly ameliorated by subtracting the unwanted noise power due to the microphone 105 and first amplifier 110 from the total signal power prior to computing the displayed decibel levels.

This approach for dealing with the lowest level input signals does have a drawback, however. Consider the short term unwanted noise power versus time. When observed over short intervals, for example 125 milliseconds, the noise from the microphone 105 and first amplifier 110 will fluctuate in an unpredictable manner because it contains low frequency noise components.

For an example, if the unwanted noise (microphone plus first amplifier) is the equivalent of 34 dB in a system without software noise correction, and a steady sound pressure level of 34 dB is present, the result is a 37 dB average measurement rather than the desired 34 dB. Another way to state this is that when an input signal is present at the same level as the noise floor of a system without software noise correction, a 3 dB average error results. Additionally, the sound level meter reading may fluctuate around that 37 dB level due to low frequency components contained in the unwanted noise. This fluctuation, however, is less when the time-weighting utilizes a longer time constant.

Now consider the same situation in an instrument with software noise correction. The noise power due to the 34 dB equivalent noise floor of the system is subtracted after the digital filtering (step #6 above) and prior to conversion to decibels (step #7 above). The resulting displayed value will now average 34 dB rather than 37 dB, effectively removing the unwanted noise in the system. The fluctuations in the measurement due to the presence of the noise, however, are not removed by this technique, and thus software noise correction is more advantageous with SLOW time weighting rather than FAST and with A frequency weighting rather than C. This is because SLOW time-weighting effectively filters out a large portion of the low frequency noise components, as does A frequency weighting, To make meaningful sound level measurements near 30 dB, the present invention makes use of the fact that the antilog of the digital time-weighted RMS signal is proportional to the mean square of the audio signal. In that this audio signal is corrupted by added noise, the antilog of the digital signal is actually the sum of the mean square of the ideal noise-free audio signal and the mean square of the added noise. The present invention can subtract out the mean square noise from the sum, thus resulting in an approximation of the desired signal. This method provides meaningful measurements at low levels even when significant system noise is present, but has certain limitations. As described above, the fluctuation of the unwanted noise is not removed although the average measurement value is corrected. This is because the noise power being subtracted by the algorithm is a constant. Additionally, the noise power is different for A-weighting than for C-weighting and thus the algorithm of the present method utilizes two different constants depending on the frequency weighting choice.

In the preferred embodiment disclosed herein, the microphone 105 may be a half-inch ceramic type with an integral FET amplifier, for example the model BL-1994 manufactured by Knowles Electronics, Chicago, Ill. This particular microphone is specified to have a sensitivity of −69 dB±3 dB referenced at one volt at 74 dB SPL input. Therefore, at 140 dB SPL input, the microphone 105 produces about 700 millivolts RMS and at 40 dB input it produces about 7 microvolts RMS. The microphone noise is specified to be 27 dB nominal or 34 dB worst case when measured with A frequency weighting. The C-weighted noise is higher than the A-weighted noise, between about 1 dB and 3 dB greater as measured by the inventor. Other noise sources in the sound meter of the present invention, particularly the noise of the first amplifier 110, contribute about 28 dB of noise. Thus, since the noise sources are uncorrelated, the sum of 28 dB of circuit noise and, for example, 28 dB of microphone noise results in 31 dB of total noise. This would then result in a 3 dB error when measuring a 31 dB SPL signal.

Both the lowest level and the highest level signals require special consideration in the design of measurement systems. High level signals present particular problems which are accommodated by the method and apparatus of the present invention. Because transient conditions which exceed 140 dB SPL are expected to be encountered prior to time-weighting, the apparatus must be able to measure at those high levels. Amplifiers present in the HI channel path must not saturate, and inaccuracies due to the detector in the HI channel must be minimal at the highest transient levels. Furthermore the analog-to-digital converter must not saturate at the highest signal levels.

A related concern in the apparatus of the present invention involves transient signals such as tonebursts which may temporarily saturate either the LO or MID channel amplifiers 115 or 120. A short-duration toneburst may, for example, generate a MID-channel sample near the top of its range simultaneously with a HI-channel digital sample near the bottom of its range, and due to saturation of amplifier 115, the MID-channel sample may include significant error. In such an instance, it is preferable to process the HI-channel sample. The software of the present invention preferably compares samples from both the HI and MID channels to the bottom valid values for those channels. For samples which are within the range of both the 141 and MID channels, the HI channel sample will be utilized to avoid processing the signal from the possibly saturated amplifier 115. Similarly for samples which are within the range of both the MID and LO channels, the MID channel sample will be utilized to avoid processing the signal from the possibly saturated amplifier 120.

FIGS. 4A through 4F illustrate a schematic block diagram of a more detailed embodiment of the present invention. FIG. 3 is a block diagram illustrating the arrangement of FIGS. 4A through 4F. The preferred embodiment of the circuit apparatus of the present invention is shown in six figures, FIGS. 4A–4F which show greater detail of the preferred circuit means for carrying out the method of the present invention than the general embodiment illustrated in FIG. 2. However, like numerals represent like elements, and one skilled in the art will recognize various alternate components which would be suitable. Of course, such substitutions would be within the scope of teachings of the present invention. The operation of the preferred embodiment will be described with reference to FIGS. 4A–4F.

As shown in FIGS. 4A–4F, the preferred embodiment requires +6 and −6 volt power supplies. Preferably the primary source of power for the embodiment is a single small cell, such as the common lithium 3V type. A subsystem capable of supplying the required voltage levels to power the system can be readily implemented by those skilled in the art. A span of 12 volts for the power supply is needed to ensure that the full 110 dB of dynamic range can be handled without distortion by the microphone and audio amplifiers.

FIG. 4A illustrates the input circuitry of the preferred embodiment and includes the microphone 105, input amplifier 110 and the components related to the selection of A or C frequency weighting. The microphone 105 is preferably a ceramic type with an integral field-effect transistor (FET) amplifier, such as the BL-1994 described above. Resistors 180 and 185 bias the microphone's FET amplifier. An auxiliary input connector 190 is also provided.

Analog switch 195 selects either a signal from the microphone 105 or a signal from the auxiliary input 190 for further processing. Many different available analog switch components could be utilized in the invention, such as the DG403 manufactured by Siliconix Incorporated, which can be configured as two independently controllable single-pole double-throw switches. An auxiliary input source 200 interfaced to the auxiliary input connector 190 is wired such that control line 205 is pulled close to (ground when the auxiliary input is present. This arrangement not only changes the state of analog switch 195 to select the auxiliary input signal, but also informs microcontroller 210 (see FIG. 4C) of the presence of the auxiliary source 200.

Capacitor 215 and resistor 220 comprise a high pass filter which is specified for both A and C frequency weighting. The input amplifier 110 is preferably a low-noise type arranged to have a small amount of gain, for example 6 dB. The gain of amplifier 110 must be modest to avoid overload by the loudest sounds. Following the first stage amplifier 110 is filtering circuitry which can be bypassed by the action of analog switch 230 which selects either A or C frequency weighting. Resistor 235 and capacitor 240 comprise a low pass filter which is specified for both A and C frequency weighting, however a high pass filter comprised of capacitors 245 and 250 and resistors 255 and 260 is specified only for A frequency weighting. The analog switch 230 thus bypasses this high pass filter when C weighting is selected. Analog switch 230 is controlled by A/C switch 265 via control line 270, which also informs the microcontroller 210 of the frequency weighting choice. When the high-pass filter comprising components 245, 250, 255 and 260 is switched into the circuit (A-weighting chosen) there is an approximate 2 dB loss of level at 1 kHz, referred to as the A-filter insertion loss. This small attenuation is compensated by software in the invention such that at 1 kHz the response with A-weighting selected is essentially equal to that with C-weighting selected. When the apparatus is controlled remotely, the microcontroller 210 can override the selection of A/C switch 265 by forcing control line 270 either high or low, thus selecting either A or C frequency weighting regardless of the position of A/C switch 265.

The circuitry of FIG. 4A is common to all three channels (LO, MID, HI) of the system 100 of the present invention. FIG. 4B illustrates the circuitry which is unique to each of the three channels of the system. Amplifier 272 in the HI channel preferably has a gain of −6 dB to attenuate the signal on the HI channel before presenting it to the detector 135, thus, since amplifier 110 has a gain of +6 dB, the overall audio gain in the HI channel is 0 dB. This avoids overdriving RMS detector 135, which processes the loudest sounds. The MID channel amplifies the microphone signal by 37 dB via amplifiers 110 and 115. The LO channel amplifies the microphone signal by 74 dB via amplifiers 110, 115 and 120. Capacitor 275 reduces the gain of amplifier 115 at high frequencies, as specified for both A and C weighting, and this impacts both the LO and MID channels. Capacitor 280 similarly reduces the gain of amplifier 272 for high frequencies, and this impacts the HI channel only.

As shown in FIG. 4B, the LO, MID and HI channels feed into the detectors 125, 130, and 135, respectively. Capacitors 285, 290, and 295 further shape the frequency response of the system for both A and C weighting by reducing the level of low frequency components. In the preferred embodiment illustrated, the detectors are AD637 devices available from Analog Devices. The AD637s have integral decibel computation and provide log-RMS output signals to amplifiers 140, 145 and 150. The detectors 125, 130 and 135 are set to operate with a relatively fast time constant, for example 12.5 milliseconds, controlled by averaging capacitors 300 305 and 310, which are all of equal value.

Figure 4C:
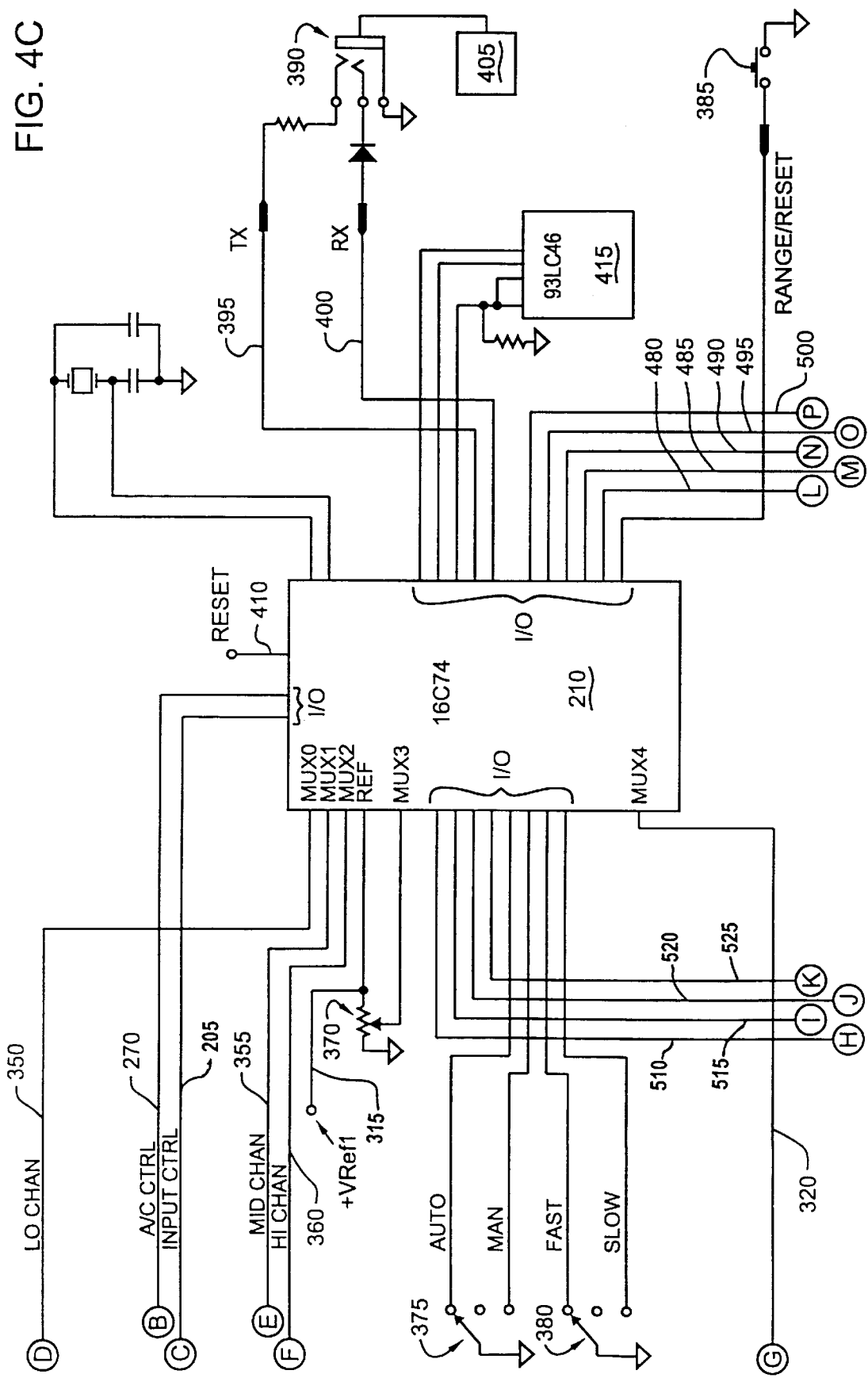

The DC amplifiers 140, 145 and 140 provide gain in order to substantially utilize the 8-bit range of the analog-to-digital converter which is integral to the microcontroller 210. Each channel is connected to the microcontroller 210 as illustrated in FIG. 4C, and each ADC step represents about 0.2 dB at room temperature. In a preferred embodiment, the microcontroller 210 operates on 6 volts with a clock frequency of approximately 4 MHz 223, and a precision 3 volt reference, +VRef1 315, is provided for its ADC (see FIG. 4C). The gain of amplifiers 140, 145 and 150 may be, for example, 20. Since the sensitivity of the AD637 log-RMS output is about 3 millivolts per decibel at room temperature. with this arrangement, each decibel change at the input to an RMS detector 125, 130 or 135 results in a 60 millivolt change at the output of the respective DC amplifier 140, 145 or 150.

The RMS detectors 125, 130 and 135 preferably provide output signals which represent the log-RMS value of the input signal and the detectors generally require temperature compensation in order to function accurately over their entire range as temperature varies. Temperature compensation is critical because the circuitry which converts the RMS to log-RMS is based upon a semiconductor junction current-voltage characteristic which is temperature-dependent.

For example, in the AD637 detectors of the preferred embodiment, the log-RMS output at 25° C. changes about 3 millivolts for each decibel of detected input level. Therefore, there would be, in this embodiment, a 111 millivolt change as the input level varies through 37 dB. At 50° C., however, a 37 dB change at the input causes a change of about 120 millivolts; while at −10° C., a 37 dB change at the input causes a change of about 98 millivolts at the log-RMS output. In addition to this predictable change in log converter gain versus temperature, there is a smaller but still significant offset change at the log-RMS outputs as a function of temperature. The necessary temperature compensation can be easily performed within the microcontroller 210, provided that the microcontroller 210 can determine the temperature by means of a sensor incorporated into the system. MUX4 input line 320 (see FIG. 4C) represents temperature and is derived from a temperature sensor, part of integrated circuit 325 shown in FIG. 4D).

Any consistent temperature-related errors can be corrected by software in the present invention, and compensation for those errors is practical provided that they can be easily characterized and that the computations required are not excessively time-consuming. In general, there will be temperature dependencies in any measurement system with wide-dynamic range and high accuracy. Any consistent temperature-related errors can be corrected by software in the present invention, and compensation for those errors is practical provided that they can be easily characterized and that the computations required are not excessively time-consuming. Due to the method of log conversion utilized in the AD637, the log converter gain varies approximately linearly with temperature as does the log converter's offset. The preferred means of temperature correction is to adjust each channel's GAIN and OFFSET values as linear functions of temperature.

Calibration is critical in the present invention in that the channel crossover points must be precise over the full 60° C. temperature range. Successful implementation of the preferred embodiment results in a virtual 110 dB of dynamic range while most of the components must function accurately over only 40 dB. Therefore, rather than requiring a single measurement channel to accommodate the full 110 dB dynamic range, the preferred embodiment of the present invention provides a system with three processing channels each of which handles about 40 dB of dynamic range. Software, as described below, is used to dynamically select the in-range channel and to apply various calibration parameters as the data stream from all three channels is processed. This is described in more detail below.

The hardware itself also requires some calibration. As shown in FIG. 4B there are three variable resistors 330, 335 and 340. These variable resistors are internal to the unit, unavailable to the user, and are adjusted during manufacturing calibration. Each of the variable resistors 330, 335 and 340 sets the "0 dB reference level" for the log computation circuitry contained within RMS detectors 125, 130 and 135, respectively. The AD637 detectors are configured in the preferred embodiment such that when the input signal is at the 0 dB reference level, the log-RMS output signal is equal to the voltage at the "common" pin, in this case +VRef1. Variable resistor 340 may be adjusted, for example, such that for 145 dB input with C-weighting selected, the log-RMS output of the HI channel detector 135 is at +VRef1. Similarly the MID channel 0 dB reference point can be set to 103 dB, and the LO channel 0 dB reference point can be set to 66 dB.

FIG. 4C illustrates the microcontroller 210, as well as the numerous connections thereto. Most of the frequency weighting components are common to all the channels, and the time weighting is performed digitally in the preferred embodiment of the present invention. However, as discussed above, each channel has a different audio gain and its own RMS detector.

The microcontroller 210 of the preferred embodiment of the present invention is a Microchip Technologies PIC 16C74, which has a multiplexed 8-bit analog-to-digital converter. Thus, the functions of the processor 160, MUX 155, ADC 170 and control lines 165 of FIG. 2 are performed within the microcontroller 210 of FIG. 4C. Sampling occurs rapidly enough to ensure accurate time weighting and toneburst response, for example 1024 samples of each channel per second.

A description of connections to the microcontroller 210 shown in FIG. 4C follows. She LO channel, MID channel, and HI channel signal lines, 350, 355 and 360, respectively, are connected to three of the multiplexer input lines referenced MUX0, MUX1, and MUX2 of the microcontroller 210. As mentioned above, the precision +3 volt reference +VRef1 315 provides the ADC reference for the microcontroller 210. In addition to the three channel signals, the multiplexer can connect the ADC to the MUX4 temperature sense line 320 or to a user-adjustable, digital trim calibration potentiometer 370. Potentiometer 370 allows the user to offset the reading by a small amount, for example +3 dB, if desired, to temporarily accommodate particular testing requirements or a microphone change without the need for full factory recalibration.

A three-position switch 375 (see also FIG. 5) is provided to select between AUTO, MAX/HOLD and MANUAL operation, and a two-position switch 380 is provided to select between FAST and SLOW time-weighting. A RANGE/RESET pushbutton switch 385 is also connected to the microcontroller 210. In the MANUAL mode of operation, pushbutton switch 385 allows the user to select any of a number of 20 dB-wide display ranges, and should the level be outside of the displayable range, either the "<" or ">" lamp will glow (refer to discussion of FIGS. 4E and 4F below). In the MAX/HOLD mode of operation, the display will hold the largest decibel value measured until pushbutton switch 385 is depressed, resetting the measurement process. In AUTO mode, the instrument will automatically range such that any decibel value within the measurement range of the instrument can be displayed.

Control line 270 connects the microcontroller 210 to the filter control switch 230. During normal operation, A/C control line 270 informs the microcontroller 210 as to the position of the switch 265 that selects either A or C weighting, and when the meter is operating under remote control, line 270 can force either A or C weighting, overriding the position of the user-settable switch 265. Similarly, input control line 205 enables the microcontroller 210 to determine whether the internal microphone 105 or the auxiliary input 1 90 is providing the audio input to the meter. Finally, a simple serial interface is provided via connector 390. A transmit line TX 395 and a receive line RX 400 provide 2-way communication capability for interface to a data logging device or a personal computer (PC) 405. The PC 405 has the capability of controlling all meter functions. Also, the meter can send real-time measurement data to the PC 405 at a rate of at least 1 measurement per second.

A microcontroller reset line 410 is derived from the power supply of the instrument, and this circuitry is not illustrated. Reset line 410 provides the power up reset function for the microcontroller 210.

In addition to the microcontroller 210, the digital circuitry of the preferred embodiment shown in FIG. 4C includes an EEPROM 415 (electrically-erasable programmable read-only memory) and display interface logic components (see FIGS. 4E and 4F) connected to the microcontroller 210. The EEPROM 415 is used for storage of calibration data and may be, for example, the 93LC46 manufactured by Microchip Technologies. The display logic is, in a preferred embodiment, comprised of 3-line to 8-line decoders 420, 425, 430, 435 and 440 shown in FIGS. 4E and 4F. These decoders may be, for example, 74AC138 integrated circuits manufactured by National Semiconductors and others. The display is discussed in more detail below.

Figure 4D:
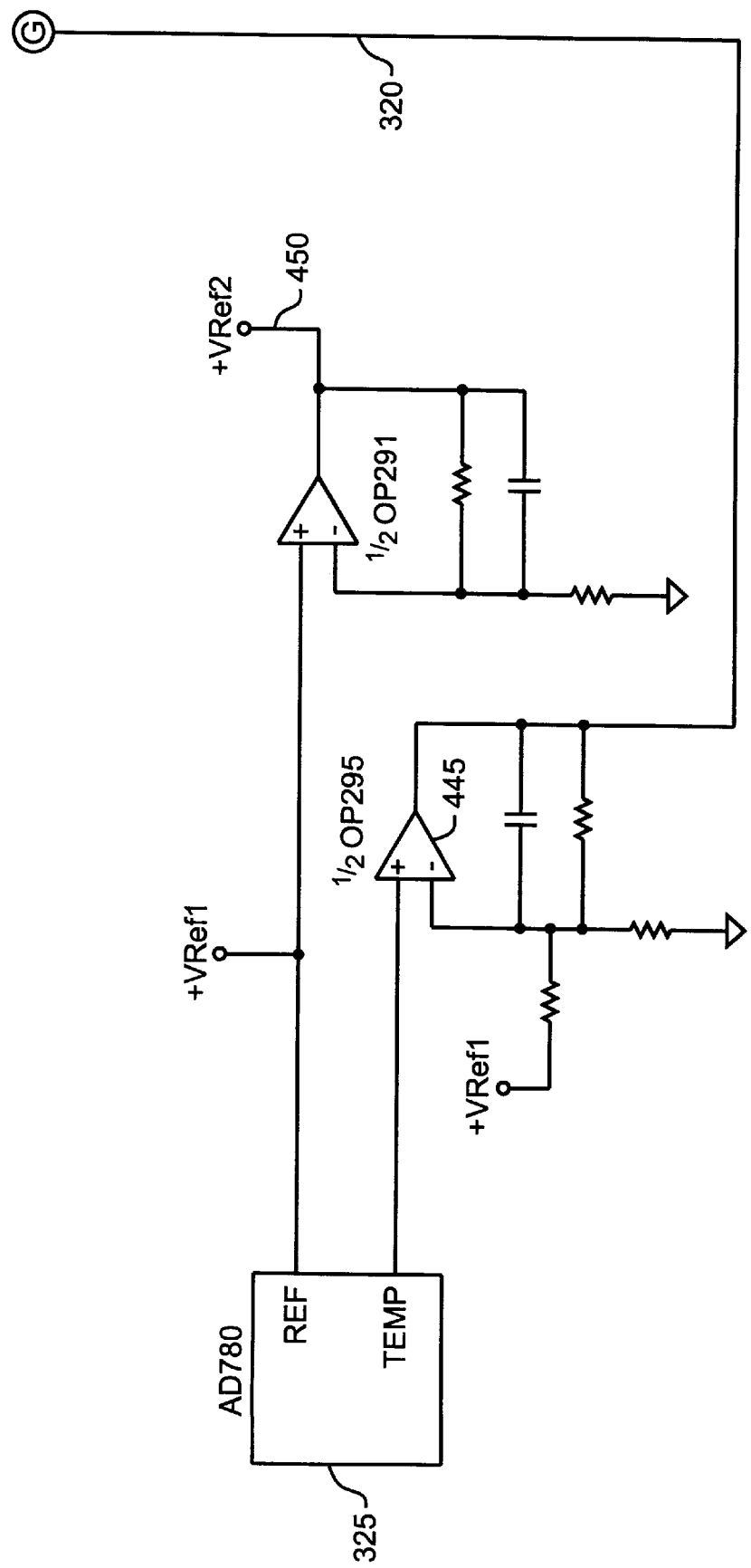

FIG. 4D illustrates both the temperature sensing circuitry and the generation of the reference voltages +VRef1 and +VRef2. Integrated circuit 325, preferably an AD780 manufactured by Analog Devices, generates the 3-volt reference +VRef1 315 used in the preferred embodiment as well as a signal which varies linearly with temperature. The temperature signal is interfaced to the microcontroller ADC via amplifier 445 which scales and offsets the signal appropriately. In a preferred embodiment, the temperature sense line 320 is scaled such that a 0.5° C. change causes a change of one ADC step, more than adequate for accurate temperature compensation. The second voltage reference, +VRef2 450, is used to supply current to the 0 dB reference adjustments 330, 335 and 340, and in a preferred embodiment +VRef2 is equal to 4.2 volts. Thus, both temperature sensing and accurate voltage references are included for proper operation of the system 100 of the present invention.

Figure 5:
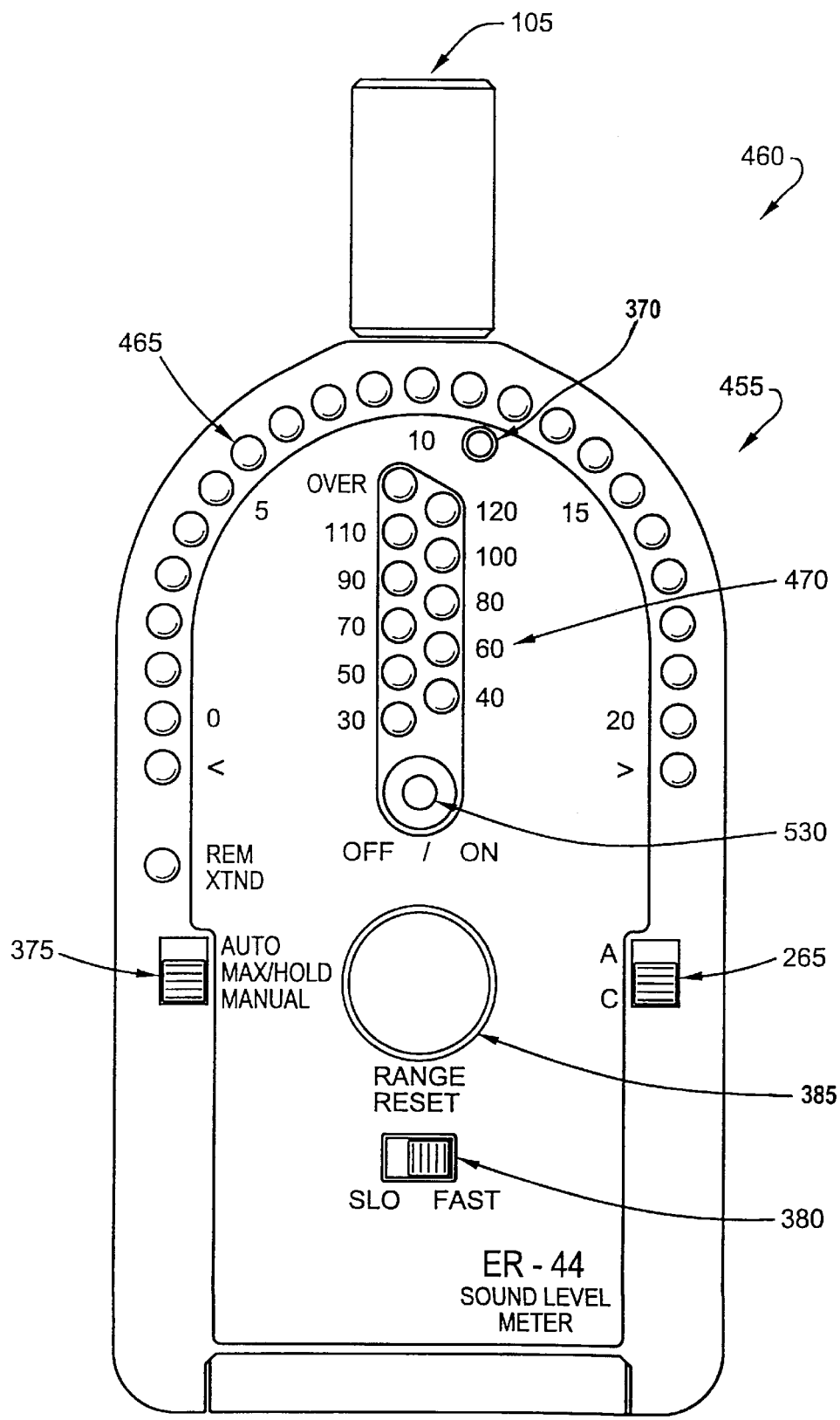
FIG. 5 is an embodiment of a sound level meter that operates in accordance with the principles of the present invention.

A display 455 of the preferred embodiment is shown in FIG. 5, which illustrates a sound level meter 460 of the apparatus of the present invention.

Display 455 is comprised of level display light-emitting diodes (Level LEDs) 465 and range display light-emitting diodes (Range LEDs) 470. The 23 level LEDs 465 of the preferred embodiment cover a 20 dB range in 1 dB increments labelled from "0" to "20" and include a "<" LED and a ">" LED. By rapidly enabling a given Level LED with its nearest neighbor, fractional decibel values can be displayed. For example, if both the "5" LED and the "6" LED are glowing, this indicates 5.5. For resolution greater than 0.5 dB on the display, lamp brightness can be modulated. In a preferred embodiment, a resolution of 0.25 dB can be displayed and easily interpreted. The interface logic for the Level LEDs 465 is illustrated in FIG. 4D and consists of the three 3-line to 8-line decoders 420, 425 and 430 controlled by microcontroller lines 480, 485, 490, 495 and 500.

Figure 4E:
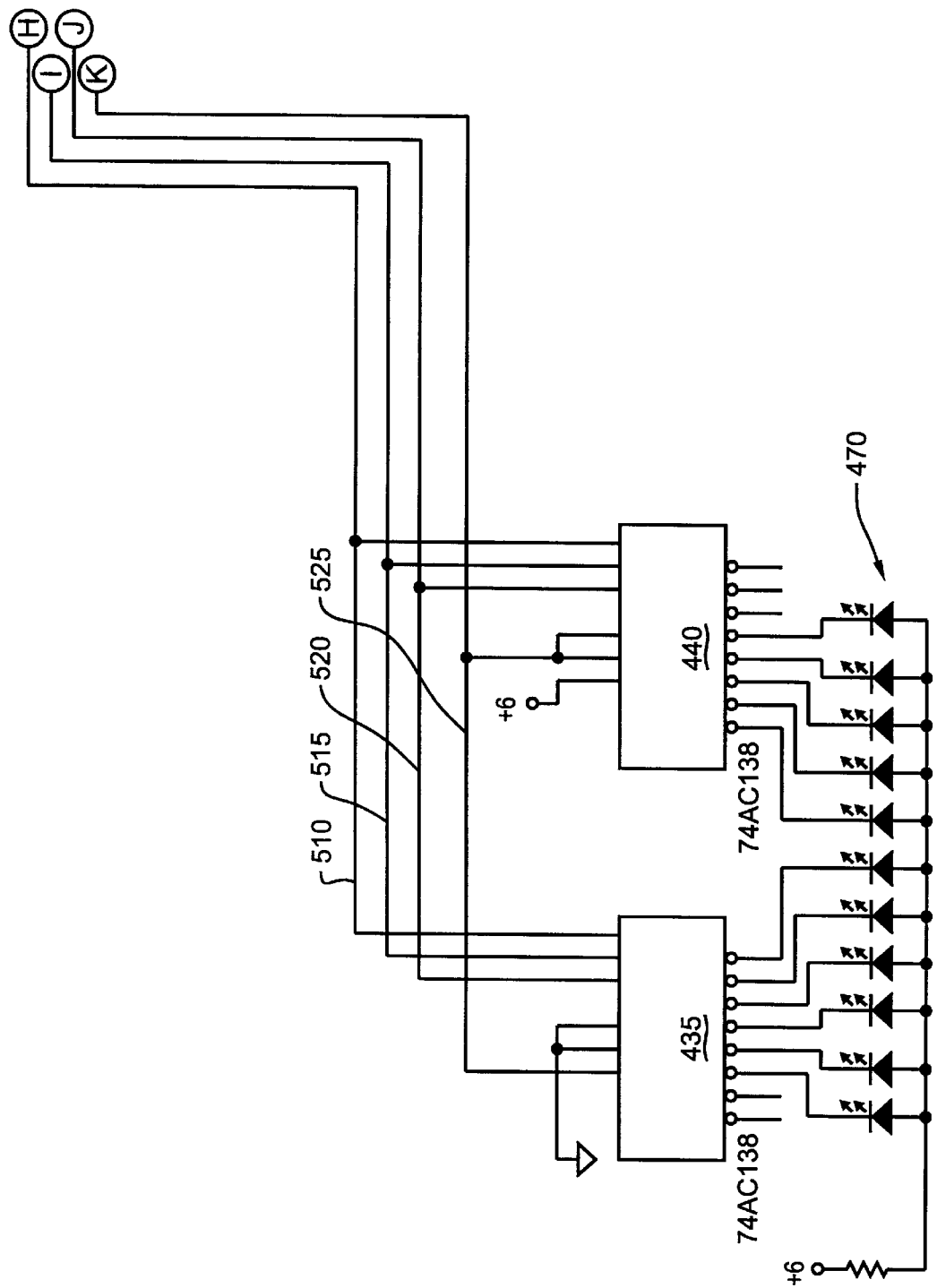

FIG. 4E illustrates two 3-to-8 line decoders 435 and 440 connected to the Range LEDs 470 and controlled by microcontroller lines 510, 515, 520 and 525. Referring again to FIG. 5, the Range LEDs 470 are labelled "30", "40", "50", "60", "70", "80", "90", "100", "110", "120", and "OVER". Thus, if Range LED "30" is lit along with Level LED "0", a 30 dB sound level is indicated; and if Range LED "120" is lit along with Level LED "20", a 140 dB sound level is indicated. The "OVER" LED is used to indicate an overload condition.

As mentioned above, FIG. 5 illustrates an embodiment of the apparatus of the present invention. The sound level meter 460 is illustrated and has an ON/OFF pushbutton 530 and a RANGE/RESET pushbutton switch 385. The features of sound level meter 460 include the user-adjustable digital trim 370 of the system gain. Also, switch 375 allows the choice of automatic ranging (AUTO) through the full 110 dB, manual selection (MANUAL) of one of ten overlapping 20 dB wide ranges, or display of the maximum value during a measurement (MAX/HOLD). Both the auxiliary input connector 190 (see FIG. 4A) and the serial interface communication port connector 390 (see FIG. 4C) are provided for data logging and remote operation of the meter 460. These two connectors 190 and 390 are located on the side of the meter 460 and are not specifically illustrated in FIG. 5. The meter 460 also provides the switch 265 to select between A and C frequency weighting and the switch 380 for selecting FAST or SLOW time-weighting. In the preferred embodiment, the meter 460 is about 5 inches tall and 2.2 inches wide and weighs less than 5 ounces.

Figure 4F:
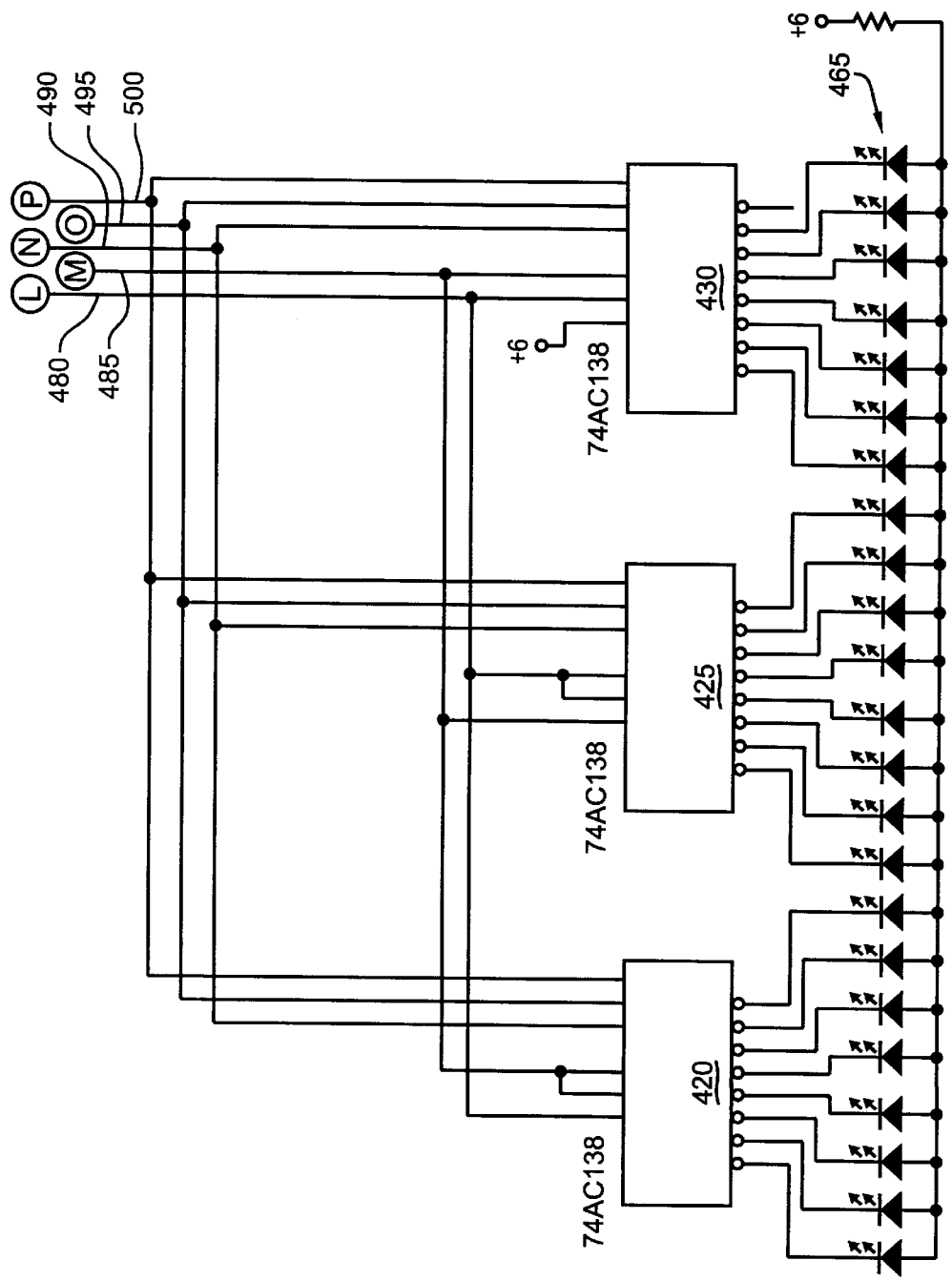

FIG. 5 also illustrates that the display 455 includes the Level LEDs 465 shown in FIG. 4D and the Range LEDs 470 shown in FIG. 4F. The 23 Level LEDs 465 are arranged in an arc and the 11 Range LEDs 470 are arranged in a staggered column roughly in the center of the display 455 of the meter 460. The Level LEDs 465 are designated from left to right as "<, 0, 1, 2, . . . 19, 20 and >". In all modes, when the level is below the lowest displayable level on the display 455, the "<" lamp glows. Similarly, if the level is above the highest displayable value, the ">" lamp glows. In AUTO mode, the "<" glows only when the signal is less than 30 dB as might occur with a shorted auxiliary input. Also the ">" glows only when the signal is greater than 140 dB in the AUTO mode. The 11 Range LEDs 465, designated from bottom to top from "30, 40, 50 . . . 110, 120 and OVER", indicate one of 10 overlapping 20 dB ranges, as well as the overload condition, which occurs when there is an excessively high level, for example, greater than 145 dB. In a preferred embodiment, the sound level meter 460 has the capability to display measurements from 30 dB to 140 dB with a resolution of 0.25 dB.

In the MANUAL ranging mode tapping the RANGE/RESET pushbutton switch 385 places the meter 460 in the next higher range. In the MAX-HOLD mode pressing the RANGE/RESET pushbutton switch 385 has the effect of resetting the instrument to the lowest range and causing it to autorange up from that point thereby seeking a new maximum. In the AUTO mode, pressing the RANGE/RESET pushbutton switch 385 has the effect of resetting the instrument to the lowest range and autoranging up from that point.

Figure 6A:
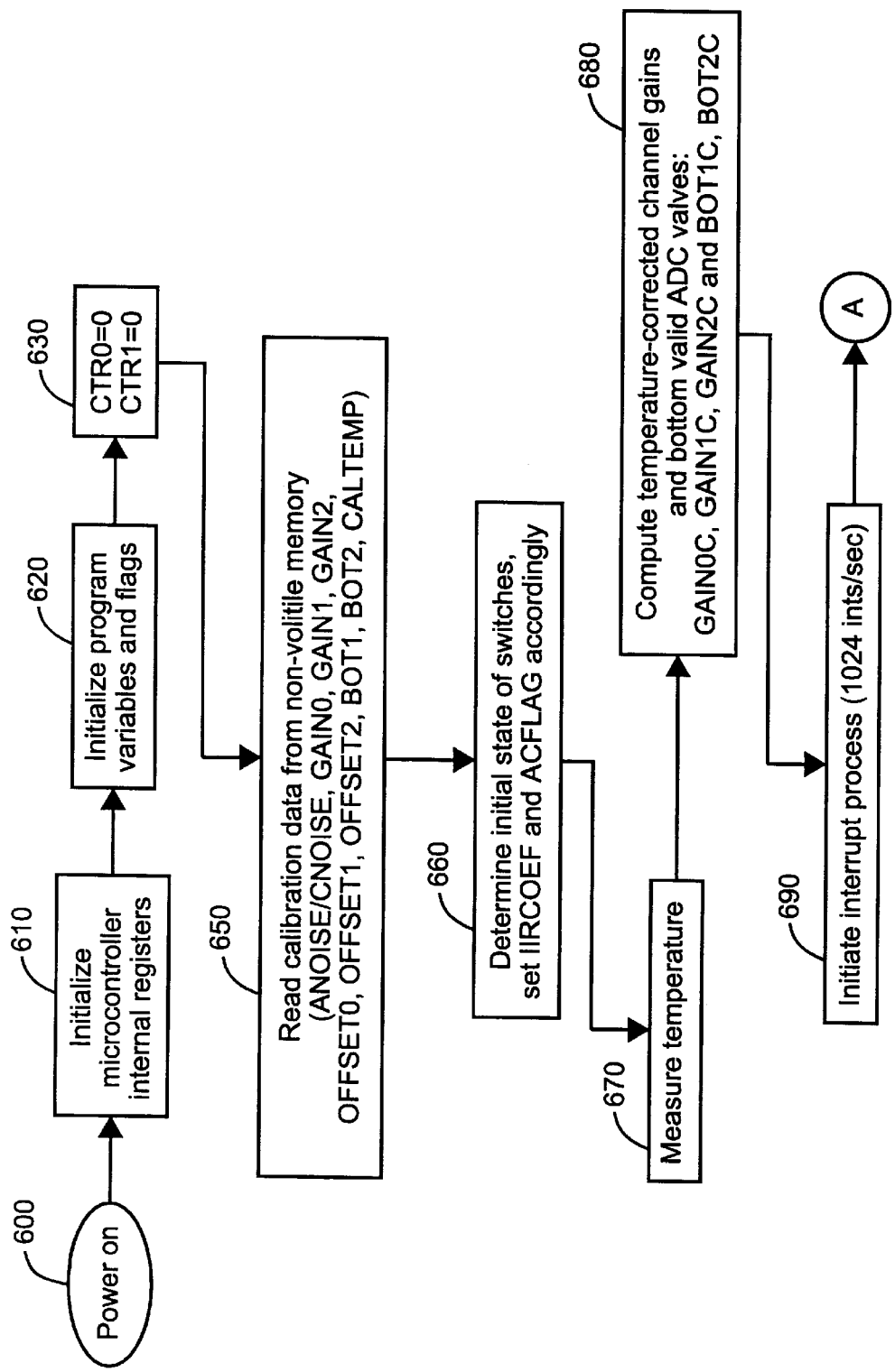
FIGS. 6A–6D are flow charts illustrating software procedures performed in a method using the apparatus of the present invention.
Figure 6B:
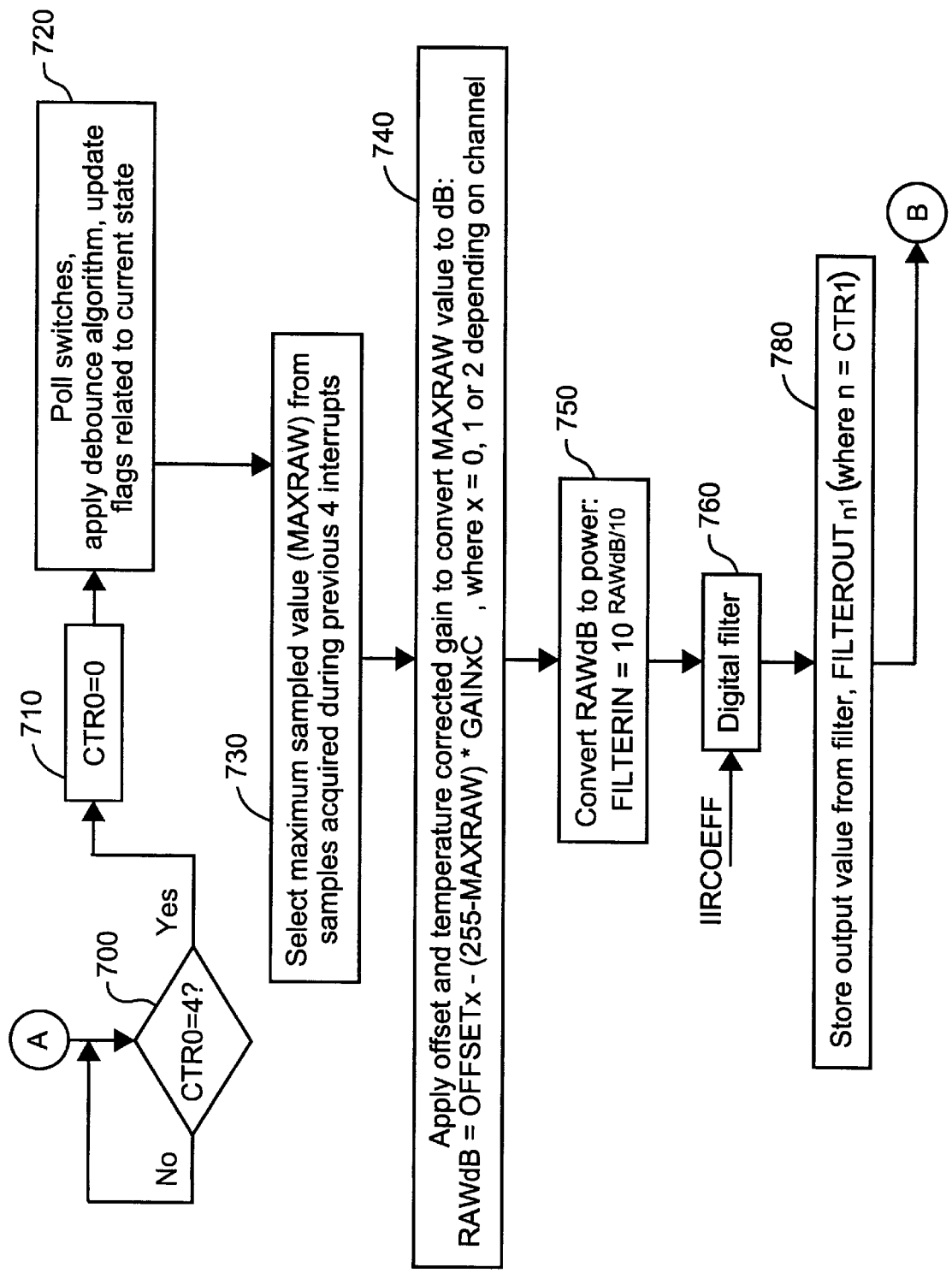
Figure 6C:
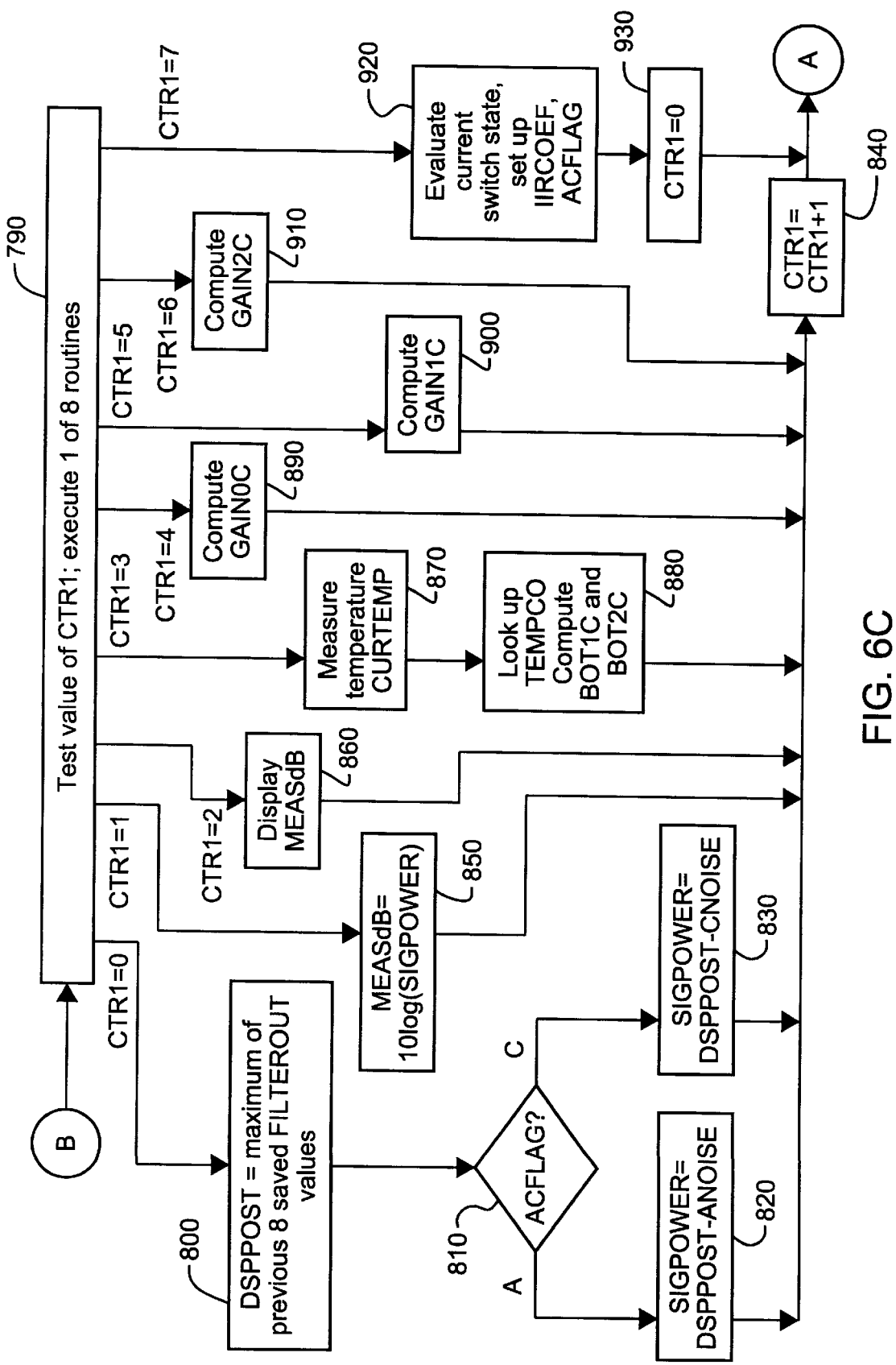
Figure 6D:
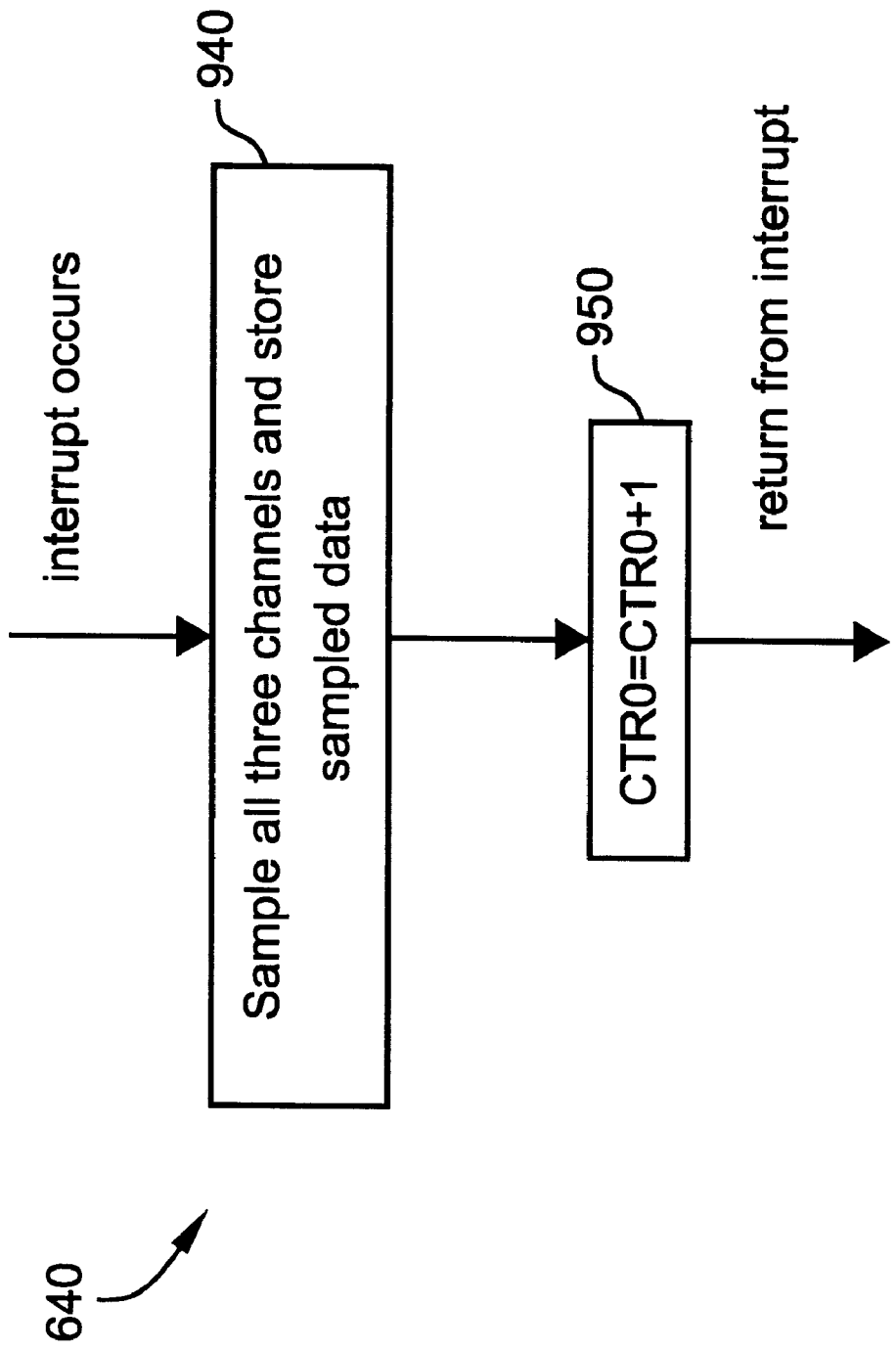

As set forth above, the microcontroller 210 is capable of processing inputs and generating outputs via software control. FIGS. 6A–6D are flow charts illustrating the function of the internal software of the meter 460. FIG. 6A represents the system startup, FIG. 6B represents the additional steps in the software that are executed 256 times per second, FIG. 6C illustrates each of eight paths executed 32 times per second, and FIG. 6D represents the interrupt service routine performed 1024 times per second. Some of the details of the software are not described in the flow charts, yet can be easily implemented by those skilled in the art of processor-based instrument control. These include:

a. correction for the A-filter insertion loss, b. the recognition and handling of various error conditions, including OVERLOAD which occurs when the level exceeds the capability of the HI channel c. the rapid multiplexing of Level LEDs for the display of fractional decibel measurement results;

d. the implementation of the MAX/HOLD mode of operation;

e. the processing of the RANGE/RESET switch actuation;

f. the inclusion of the offset to the measurement based on the setting of the user-adjustable, digital trim calibration potentiometer 370;

g. temperature correction of channel OFFSET values; and h. data logging and remote control functions.

Each of the FIGS. 6A–6D will now be described with reference to the individual blocks as shown in the flow charts.

FIG. 6A illustrates the system startup for the software utilized in an embodiment of the present invention. When a user activates the meter 460 shown in FIG. 5 by pressing the ON/OFF button 530, the software sees a power-on signal 600 generated, as shown in FIG. 6A. When the power is turned on, various internal registers and flags in the microcontroller 210 must be initialized, as shown in block 610. Also block 620 shows that program variables and flags are initialized in the microcontroller 210.

In addition, at power up, a first counter CTR0 and a second counter CTR1 are both set to zero as indicated in block 630. The counter CTR0 keeps track of interrupts and counts from zero to four repeatedly. It is incremented by an interrupt service routine 640 described below with reference to FIG. 6D. When CTR0 reaches a count of four, it indicates that four sampling routines have been executed. At this point, other processes occur on the acquired data samples from the three channels, LO, MID and HI.

Also, as described above with reference to FIG. 4C, the apparatus of the present invention includes nonvolatile storage in the form of the EEPROM 415. This storage in the EEPROM 415 contains calibration data for the system 100. At system startup, as indicated in block 650, the calibration data is read from the EEPROM 415. Data in the EEPROM 415 includes the temperature at which calibration was performed (CALTEMP); the A and C-weighted microphone noise levels used for the correction of low level measurement readings (ANOISE and CNOISE); the GAINs (GAIN0, GAIN1 and GAIN2) and OFFSETs (OFFSEF0, OFFSEF1 and OFFSEF2) of all of the channels in the system as determined at the calibration temperature CALTEMP; the valid bottom ADC values for both the MID and HI channels (BOT1 and BOT2) at CALTEMP; calibration data for the temperature sensor; and other miscellaneous information such as the instrument serial number and the data of manufacture. It is important to know the CALTEMP because temperature compensation is based on the difference between CALTEMP and the current temperature. GAIN0 and OFFSET0 apply to the LO channel of the meter 460 at the calibration temperature CALTEMP. The LO channel supports the lowest level input signals and is therefore the channel with the highest audio gain. BOT1, GAIN1 and OFFSET1 apply to the MID channel at CALTEMP; and BOT2, GAIN2 and OFFSET2 apply to the HI channel at CALTEMP. The HI channel supports the highest level input signals and is therefore the channel with the lowest audio gain. In a preferred embodiment of the invention, GAIN0, GAIN1 and GAIN2 are varied with temperature yielding GAIN0C, GAIN1C and GAIN2C. Also the lowest valid ADC output values for the MID and HI channels are temperature-compensated, yielding BOT1C and BOT2C respectively. The OFFSETs may also be varied with temperature, though this detail is not shown in the flow charts. The OFFSETs are in units of decibels, the GAINs are in units of decibels per ADC step and BOT1 and BOT2 are in units of ADC steps. For example, in an embodiment of the invention in which an 8-bit ADC is utilized, OFFSET2 may equal 145 dB, OFFSET1 may equal 103 dB, and OFFSET0 may equal 66 dB. Also, GAIN2, GAIN1, and GAIN0 may all equal approximately 0.2 dB per ADC step, BOT2 may equal approximately 45 and BOT1 may equal approximately 70.

There are three channels in the analog circuitry of the preferred embodiment of the invention, each with its own RMS detector, and the ADC in the system has 8 bits, thus the ADC top value is 255 ($2^8-1$). The manner in which the RMS detectors are interfaced and calibrated is such that when the audio signal is at a channel's 0 dB reference level, the RMS detector output voltage is equal to +VRef1, resulting in an ADC output of 255. As the level decreases from the 0 dB reference level, for example 103 dB in the MID channel, the ADC output digital value also decreases. As described above, there is a significant temperature dependence in the conversion of RMS level to a value corresponding to decibels at the log-RMS output of the detector. The approximate 3 millivolt per dB sensitivity at room temperature increases at higher temperatures and decreases at lower temperatures. Therefore, the software of the present invention compensates for this effect.

Because the 0 dB reference level of each of the three detectors remains essentially constant with temperature, the bottom valid level for each of the channels varies substantially with temperature in accordance with the aforementioned temperature dependence. Therefore, periodically, whenever the temperature of the system is measured by the microcontroller, the channel GAINs (dB per ADC step) GAIN0C, GAIN1C and GAIN2C as well as the lowest valid ADC output values for the MID and HI channels, BOT1C and BOT2C, are recalculated.

Block 660 illustrates that the initial state of the switches 375, 380 and 265 is determined at system startup. For example, it must be determined whether A-weighting or C-weighting has been selected using switch 265 on the meter 460, as well as whether the FAST or SLOW time averaging has been selected using switch 380. A and C weighting are particular to the measurement of sound level, and because A and C weighting involve different microphone noise correction terms, as well as the potential need to adjust for the A-filter insertion loss, it is important to note the state of the A/C switch at startup. The ACFLAG is set according to the A or C weighting choice. The choice of FAST or SLOW sets up a coefficient value used in the digital filter. This coefficient, termed IIRCOEF, is discussed further below.

Continuing through the flow chart of FIG. 6A, block 670 indicates that the temperature is measured during startup. Consequently, block 680 indicates that the temperature corrected channel GAINs and bottom valid values BOT1 and BOT2 are computed, as required. Temperature is measured periodically to update the three temperature compensated GAIN terms and bottom valid ADC values. Finally, block 690 indicates that the interrupt process is initiated at startup. As soon as system startup is complete, the system will begin to sample analog data from the three channels 1024 times per second.

FIG. 6B is a continuation of the flow chart of FIG. 6A. As illustrated, the system of the present invention waits until four interrupts occur before executing the software code illustrated in FIG. 6B. Decision block 700 indicates that when CTR0=4, the software steps of FIG. 6B begin execution. As block 710 indicates, the first operation performed is resetting CIR0 to 0.

Next, block 720 illustrates that the switches are polled (scanned) 256 times per second. For example, switch 265 that selects between A-weighting or C-weighting and switch 380 which selects either FAST or SLOW time-weighting are polled. Thus, this section of the software polls the switches and ensures that they are adequately debounced before updating the current switch state flags. Switch debounce can occur in hardware and/or software and can be accomplished by various means known to one skilled in the art.

The next step, illustrated by block 730, states that the software selects the value which is representative of the largest analog level called MAXRAW from samples acquired during the four previous interrupts. If each of the three channels is sampled four times, there are 12 different values to consider upon entering this portion of the software. The valid range of values that the ADC 170 might acquire from each of the three channels (LO, MID and HI) is known. Each channel spans a certain decibel range. The ADC output value which represents the top of any channel's range is 255 and the ADC output value which occurs when any channel is beyond its upper decibel limit, i.e. saturated, is also 255; therefore, valid ADC values must be less than or equal to 254. For the HI and MID channels, the ADC output value which represents the valid bottom of any channel's range is BOT2C or BOT1C respectively, and both BOT2C and BOT1C vary with temperature. Therefore if the HI channel value is greater than BOT2C and less than 255, it is a valid sample. If the HI channel value is equal to 255, then an OVERLOAD condition exists (not shown in the flow charts). Alternatively, if the MID channel value is greater than BOT1C and less than 255, it is a valid sample. The LO channel value must be less than 255 to be valid.

The steps for determining MAXRAW from the 12 samples is as follows:

a. of the four samples acquired from the HI channel, ignore all but the greatest;

b. of the four samples acquired from the MID channel, ignore all but the greatest;

c. of the four samples acquired from the LO channel, ignore all but the greatest;

d. if the greatest HI channel sample is greater than BOT2C, MAXRAW is set equal to the greatest HI channel sample;

e. if MAXRAW has not been set to the greatest HI channel value, and the greatest MID channel sample is greater than BOT1C and less than 255, MAXRAW is set equal to the greatest MID channel sample;

f. if MAXRAW has not been set to either the greatest HI channel value or the greatest MID channel value, MAXRAW is then set to the greatest LO channel sample.

The next step in this method is the application of the appropriate OFFSET (see block 640 in FIG. 6A) and temperature-corrected GAIN values to convert MAXRAW into decibels. The resulting quantity is referred to as RAWdB. As shown in block 740, the formula is RAWdB= OFFSETx−(255−MAXRAW)*GAINxC, where x=0 if MAXRAW has been set to a LO channel sample, x=1, if MAXRAW has been set to a MID channel sample, and x=2 if MAXRAW has been set to a HI channel sample. The RAWdB value is then converted into a value representative of signal power, as illustrated in block 750. The resulting power value is the input to a digital filter, and is referred to as FILTERIN which is calculated by FILTERIN=$10^{RAWdB/10}$. The digital filter in block 760 receives the FILTERIN value from block 750 and the IIRCOEF value 770. IIRCOEF is set based upon the selection of the FAST/SLOW switch 380.

The digital filter in block 760 is preferably a single pole IIR (infinite impulse response) type. The filter is simple and simulates the action of the simple resistor/capacitor filter 35 of FIG. 1. The computation of the digital filter output sample FILTEROUT requires knowledge of the previous digital filter output sample:

FILTEROUT=FILTEROUT$_{previous}$+(FILTERIN− FILTEROUT$_{previous}$)*$2^{IIRCOEF}$.

This digital filtering method is well-known to those skilled in the art and the appropriate value of IIRCOEF for FAST (125 millisecond time constant) and SLOW (1 second time constant) is easily computed for a given filter sampling rate. With a filter sampling rate of 256 samples per second, as in the preferred embodiment of the invention, for SLOW time-weighting, the ideal IIRCOEF is approximately equal to 8, and for FAST time-weighting, the ideal IIRCOEF is approximately equal to 5. With IIRCOEF being an integer, the filter computation is simple and rapid and the use of the above integer values for IIRCOEF in the preferred embodiment provides highly accurate time-weighting.

In the preferred embodiment of the invention, the displayed measurement result is updated 32 times per second.

More rapid updating of the display is unnecessary because the user is not generally able to perceive more rapid changes. Thus, because the display 455 is updated once per eight digital filter samples, the filter output values FILTEROUT$_n$ where n=0, 1, 2 . . . 7 are stored for subsequent processing and display, as indicated by block 780 of FIG. 6B. A group of eight filter output samples are forwarded to the software steps indicated in FIG. 6C.

FIG. 6C indicates at block 790 that the test value of CTR1 determines which one of eight subroutines or paths are executed in FIG. 6C. The time required to execute the software illustrated in FIG. 6B, plus the time required to execute any of the eight paths illustrated in FIG. 6C must not exceed 1/256 of a second. The software algorithm of the present invention cannot function as intended unless the data sampled during the 4-interrupt interval of time (1/256 second) has processed before the next 4-interrupt interval completes.

In implementing the software of the present invention, attention to the complexity of algorithm routines is important to avoid the aforementioned timing error. For example, the log and antilog functions are performed by table look-up, and another table provides the temperature coefficient TEMPCO which is used to compute BOT1C, BOT2C, GAIN0C, GAIN1C and GAIN2C. Also, whenever possible, fixed point computations are performed rather than more complex and time-consuming floating point computations. A description of the eight different paths shown in FIG. 6C corresponding to the eight values of CTR1 follows. Each path is described in turn. In a period of 1/32 of a second, all eight of the paths are executed once.

The first path, labeled CTR1=0, selects the maximum of the previous eight saved FILTEROUT values as indicative in block 800. This maximum value is called DSPPOST. Thus, DSPPOST is the largest filter output sample of the previous 32 millisecond period and is in units of power. Blocks 810, 820 and 830 represent the software noise correction algorithm which improves the low level accuracy of the invention. Decision block 810 tests to see whether the ACFLAG is set. If the ACFLAG is set, the software proceeds to block 820 along line A, indicating A-weighting. Block 820 then computes SIGPOWER which is calculated as

SIGPOWER=DSIPOST−ANOISE.

Alternatively, if the ACFLAG is clear, indicating that C-weighting has been selected, SIGPOWER is computed as shown in block 830 with is connected to the decision block 810 via line C. In this instance,

SIGPOWER=DSPPOST−CNOISE.

After either block 820 or block 830 is executed. CTR1 is incremented as indicated in block 840. The software then returns to the decision block 700 shown in FIG. 6B and continues.

The second path, which is labeled CTR1=1, indicates in block 850 that the measured decibel value MEASdB is computed by calculating MEASdB=10log(SIGPOWER). Again, CTR1 is increment as shown in block 840 and the method continues back to the decision block 700 shown in FIG. 6B.

The third path, labeled CTR1=2, indicates block 860 that the MEASdB value is displayed. Various details depend on the display type and display resolution. As before CTR1 is incremented in block 840 and the method continues back at decision block 700 of FIG. 6B.

The fourth path, labeled CTR1=3, uses the ADC to measure temperature as indicated in block 870. The current temperature is referred to as CURTEMP. Block 880 indicates that the TEMPCO is looked up in a software table of values. The quantity TEMPCO which results from the software table look-up in the preferred embodiment is based upon the following equation:

TEMPCO=1/[1+(CURTEMP−CALTEMP)*TCOEF]

where TCOEF represents the temperature coefficient of the log conversion circuitry of the RMS detectors (for Analog Devices' AD637, TCOEF=0.0033). TEMPCO decreases with increasing temperature. Also shown in block 880 is that the bottom valid values for the HI and MID channels. BOT2C and BOT1C, are computed. BOT2C is computed by using the following equation:

BOT2C=255−(255−BOT2)/(TEMPCO).

The span of the HI channel at CALTEMP is thus equal to 255−BOT2 and this span increases with temperature. Similarly, the temperature-corrected bottom valid value of the MID channel, BOT1C is also computed. Again, as with the previous paths, CTR1 is incremented, as shown in block 840, and the software continues at decision block 700 of FIG. 6B.

The fifth path, labeled CTR1=4, computes the temperature corrected GAIN for the LO channel, GAIN0C, as shown in block 890 using the equation

GAIN0C=TEMPCO*GAIN0.

This GAIN, expressed in decibels per ADC step, increases as the temperature decreases because the detector's log-RMS output sensitivity decreases as temperature decreases, so the software must compensate accordingly. Again, CTR1 is incremented in block 840 and the software continues at 700.

The sixth path, labeled CTR1=5, and the seventh path, labeled CTR1=6, compute GAIN1C, as shown in block 900, and GAIN2C, as shown in block 910. These computations are carried out similarly to that in block 890. For example, in the sixth path,

GAIN1C=TEMPCO*GAIN1 and in the seventh path,

GAIN2C=TEMPCO*GAIN2.

As with the other paths, CTR1 is incremented in block 840 and the software continues at decision block 700 in FIG. 6B.

Finally, the eight path, labeled CTR1=7, evaluates the current switch state as shown in block 920 and, based on the switches 380 and 265, IIRCOEF and ACIFLAG are set accordingly. Following execution of this eighth path, CTR1 is reset to 0 in block 930 and the software continues again at decision block 700 of FIG. 6B.

FIG. 6D illustrates the interrupt service routine 640 described above with reference to block 690 in FIG. 6A. FIG. 6D illustrates in block 940 that, when an interrupt occurs, all three channels are sampled and the data is stored. Subsequently, CTR0 is increment by 1, as shown in block 950. Then the software returns from the interrupt as shown in FIG. 6D.

As illustrated by the flow charts and described herein, the software of the present invention continually samples each of three analog channels 1024 times per second, continually processes these samples and computes a time-weighted decibel value 256 times per second, and continually updates the displayed measurement result 32 times per second. Furthermore, the software continually compensates for temperature-dependent hardware by measuring temperature and calculating all temperature-related parameters 32 times per second.

Although the present invention has been described with reference to specific embodiments, those of skill in the art will recognize that changes may be made thereto without departing from the scope and spirit of the invention as set forth in the appended claims.

What is claimed is:

1. An apparatus for measuring a varying average magnitude over time of signals having a wide dynamic range, the apparatus comprising:
   a single transducer for sensing a physical parameter having a magnitude and converting the physical parameter to an electrical signal indicative of the magnitude of the physical parameter;
   a plurality of signal processing channels operatively connected to the transducer and having different gains, each of the plurality of signal processing channels for receiving the electrical signal and having a detector responsive to the electrical signal for providing an output signal, each output signal being indicative of an average magnitude of the physical parameter within one of a plurality of different preselected magnitude ranges, each respective one of the plurality of different preselected magnitude ranges corresponding to the gain of a respective one of the plurality of signal processing channels, each of the plurality of signal processing channels using an averaging process having a first time constant; and
   control circuitry for selecting only one of the output signals during each of a plurality of time periods, generating from the selected output signals a magnitude signal, and averaging the magnitude signal using a second time constant greater than the first time constant to provide an average output magnitude signal indicative of the average magnitude of the physical parameter.

2. The apparatus of claim 1, further comprising:
   a signal processor connected to the transducer for processing the electrical signal to provide a processed signal, the processed signal being provided to the detectors.

3. The apparatus of claim 1, further comprising:
   a display for receiving an output display signal from the control circuitry and providing an indication corresponding to the output display signal.

4. The apparatus of claim 1, further comprising:
   an auxiliary input connected to each of the plurality of signal processing channels.

5. The apparatus of claim 1, further comprising:
   a temperature sensor connected to the control circuitry such that the control circuitry provides temperature compensation.

6. The apparatus of claim 1, further comprising:
   a data port connected to the control circuitry.

7. The apparatus of claim 1, wherein the control circuitry provides processing for automatic ranging of the output magnitude signal.

8. The apparatus of claim 1, further comprising:
   a circuit for sensing the physical parameter at a plurality of sampling rates.

9. The apparatus of claim 1, wherein the control circuitry comprises a microcontroller.

10. An apparatus of claim 1, wherein the detectors each comprise root-mean-square (RMS) detectors.

11. The apparatus of claim 1, wherein the detectors each comprise log-RMS detectors.

12. The apparatus of claim 1, wherein the control circuitry includes an analog-to-digital (A/D) converter for sampling the output signals.

13. The apparatus of claim 1, wherein the physical parameter is sound pressure level.

14. The apparatus of claim 1, wherein the transducer comprises a microphone.

15. The apparatus of claim 12, wherein the control circuitry comprises:
    a multiplexer connected to the analog-to-digital converter; and
    a microprocessor connected to the multiplexer.

16. The apparatus of claim 1, further comprising:
    means for providing a plurality of operational modes connected to the control circuitry.

17. An apparatus for measuring a varying average magnitude over time of signals having a wide dynamic range, the apparatus comprising:
    a single transducer for sensing a physical parameter having a magnitude and converting the physical parameter to an electrical signal indicative of the magnitude of the physical parameter,
    a first signal channel operatively connected to the transducer and having a first gain, the first signal channel having a first detector responsive to the electrical signal for providing a first output signal, the first output signal being indicative of an average magnitude of the physical parameter in a first magnitude range, the first magnitude range corresponding to the first gain, the first signal channel using an averaging process having a first time constant;
    a second signal channel operatively connected to the transducer and having a second gain, the second signal channel having a second detector responsive to the electrical signal for providing a second output signal, the second output signal being indicative of an average magnitude of the physical parameter in a second magnitude range, the second magnitude range corresponding to the second gain, the second signal channel using the averaging process having the first time constant;
    a third signal channel operatively connected to the transducer and having a third gain, the third signal channel having a third detector responsive to the electrical signal for providing a third output signal, the third output signal being indicative of an average magnitude of the physical parameter in a third magnitude range, the third magnitude range corresponding to the third gain, the third signal channel using the averaging process having the first time constant; and
    control circuitry for selecting only one of the first, second and third output signals during each of a plurality of time periods, generating from the selected output signals a magnitude signal, and averaging the magnitude signal using a second time constant greater than the first time constant to provide an average output magnitude signal indicative of the average magnitude of the physical parameter.

18. The apparatus of claim 17, wherein the control circuitry comprises a processor, a multiplexer and an analog to digital converter.

19. The apparatus of claim 17 further comprising first, second and third amplifiers.

20. The apparatus of claim 17 wherein the first amplifier is located in the first signal channel, the first and second amplifiers are located in the second signal channel, and the first, second and third amplifiers are located in the third signal channel.

21. The apparatus of claim 20 wherein the first gain is determined by the first amplifier, the second gain is determined by the first and second amplifiers, and the third gain is determined by the first, second and third amplifiers.

22. The apparatus of claim 17 wherein the first gain is lower than the second and third gains, and the second gain is lower than the third gain.

23. The apparatus of claim 22 wherein the first magnitude range comprises relatively high level signals, the second magnitude range comprises relatively moderate level signals, and the third magnitude range comprises relatively low level signals.

24. The apparatus of claim 23 wherein the magnitude of the physical parameter comprises decibels, and wherein the first magnitude range is approximately 103 to 145 dB, the second magnitude range is approximately 66 to 103 dB, and the third magnitude range is approximately 30 to 66 dB.

25. An apparatus for measuring a varying average magnitude over time of signals having a wide dynamic range, the apparatus comprising:

a single transducer for sensing a physical parameter having a magnitude and converting the physical parameter to an electrical signal indicative of the magnitude of the physical parameter;

a plurality of signal processing channels operatively connected to the transducer, each having a different gain and generating from the electrical signal a different output signal within one of a plurality of different magnitude ranges, each output signal being indicative of an average magnitude of the physical parameter within a respective one of the different magnitude ranges, each of the plurality of signal processing channels using an averaging process having a first time constant; and p1 control circuitry for selecting only one of the plurality of the output signals during each of a plurality of time periods, generating from the selected output signals a magnitude signal, and averaging the magnitude signal using a second time constant greater than the first time constant to provide an average output magnitude signal indicative of the average magnitude of the physical parameter.

26. The apparatus of claim 25 wherein the magnitude of the physical parameter comprises decibels, and wherein the plurality of different magnitude ranges together form a total range of at least 110 decibels.

* * * * *